(12) United States Patent
Pyron et al.

(10) Patent No.: US 7,332,678 B2
(45) Date of Patent: Feb. 19, 2008

(54) BUTTON STYLE CORD CONNECTOR

(75) Inventors: Roger Pyron, Bartlett, TN (US); Craig Yoss, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/491,221

(22) Filed: Jul. 21, 2006

(65) Prior Publication Data

US 2007/0026735 A1   Feb. 1, 2007

Related U.S. Application Data

(60) Provisional application No. 60/701,415, filed on Jul. 21, 2005.

(51) Int. Cl.
*H02G 3/18* (2006.01)

(52) U.S. Cl. .................................................. 174/660

(58) Field of Classification Search ............ 174/153 G, 174/650, 654, 668, 660, 667, 659, 666, 669; 248/56
See application file for complete search history.

(56) References Cited

U.S. PATENT DOCUMENTS

| | | | |
|---|---|---|---|
| 2,458,409 A * | 1/1949 | Paige | 285/154.1 |
| 3,351,974 A * | 11/1967 | Wilhelmi | 16/2.1 |
| 3,365,761 A | 1/1968 | Kalvig | |
| 3,516,111 A | 6/1970 | Heyman | |
| 3,689,014 A | 9/1972 | Fink | |
| 3,788,655 A | 1/1974 | Hathaway | |
| 4,299,363 A | 11/1981 | Datschefski | |
| 4,350,839 A | 9/1982 | Lass | |
| 4,361,302 A | 11/1982 | Lass | |
| 5,037,326 A | 8/1991 | Reedy | |
| 5,410,104 A | 4/1995 | Gretz et al. | |
| 5,454,479 A | 10/1995 | Kraus | |
| 5,658,110 A | 8/1997 | Kraus | |
| 5,702,076 A * | 12/1997 | Humber | 248/57 |
| 6,179,646 B1 | 1/2001 | Horchler | |

OTHER PUBLICATIONS

Tapper Sealing Technology AB, Title: Cable Entries, twelve (12 pages), published Feb. 16, 2005, published in Sweden, info@tappersealingtechnology.com, www.tappersealingtechnology.com.

Tapper Sealing Technology, Title: Cable and Pipe Entries, eleven (11 pages), published Mar. 22, 2005, published in Sweden, info@tappersealingtechnology.com, www.tappersealingtechnology.com.

Tapper Sealing Technology AB, Title Environmental Facts, produced by E.L. Electrical Material Suppliers Association, the material is based on Nuteks project "Advice for Purchasers", seven (7 pages), info@tappersealingtechnology.com, www.tappersealingtechnology.com.

* cited by examiner

*Primary Examiner*—Neil Abrams
(74) *Attorney, Agent, or Firm*—Hoffmann & Baron, LLP

(57) ABSTRACT

This invention pertains to a cord connector that both seals and provides strain relief automatically upon wire insertion. The cord connector comprises a wire passageway through a pliable shell which seals around both the wire inserted through the passageway as well as the knock-out or wall opening into which the connector is secured. A more rigid skeleton supports this shell and is provided with appendages which permit the wire to pass through the passageway but which block or resist any removal of the wire from the passageway. Preferably the shell is overmolded over the skeleton for ease of manufacture.

43 Claims, 15 Drawing Sheets

US 7,332,678 B2

BUTTON STYLE CORD CONNECTOR

This utility application claims priority from the U.S. provisional application Ser. No. 60/701,415 filed on Jul. 21, 2005 which has disclosure document number T&B 1894 filed on Jul. 21, 2005 attached to it, all of which is incorporated by reference herein.

FIELD OF THE INVENTION

This invention, in general, pertains to cord connectors for supporting electrical wire to a wall or a panel of an enclosure. More particularly, the present invention pertains to a connector for an electric cable providing both sealing and strain relief characteristics.

BACKGROUND OF THE INVENTION

Liquid tight cord connectors are quite common for supporting electric wire passing through an aperture of an electrical enclosure or a wall. These cord connectors are often used to protect wires or tubes passing through such apertures against wear or shock or both.

FIGS. 1-7 of U.S. Pat. No. 2,458,409 discloses a connector member with integral spring-like fingers cooperating with and preventing axial movement of a cable member after it is inserted into the knockout hole through the connector member.

FIGS. 1-8 of U.S. Pat. No. 3,516,111 shows a bushing member having a plurality of flexible generally pie-shaped supports, each adapted to accept the placement of an element there between to yield in the direction of element positioned through the opening for resilient engagement with the element.

FIGS. 1-10 of U.S. Pat. No. 4,299,363 shows a connector formed from a resiliently flexible material with a plurality of jaws directed toward the axis center of the connector to resiliently seat against the inserted cable to oppose withdrawal of the cable from the connector.

FIG. 2 of the U.S. Pat. No. 5,410,104 discloses a low profile connector compressible grommet for use in a connector having internally inclined surfaces with a plurality of ribs spaced about the periphery of a sleeve with spaces between the apexes.

These connectors are typically pushed or otherwise inserted into an opening in the enclosure such as a knock-out of an electrical outlet box or panel. Once the connector is in place, a wire or cable is then pushed through its center and into the enclosure for subsequent termination with an electrical device or fixture inside the box. The connector itself is generally configured with a plurality of inwardly extending fingers that engage and grip the wire and which permit the wire to be pushed into the box but which make it difficult to pull the wire back out of the box. Hence such connectors not only help isolate the wire from the sharp edges of the knock-out, but they also provide strain relief by transferring the wire withdrawal force to the enclosure itself rather than allowing such force to proceed to the terminated end of the wire and thus to the device to which the wire is connected.

Most such connectors are made of plastic as in the '363 patent, but metal connectors exist as well (see, for example, the '409 patent). Also, such connectors are generally of one piece construction, but multiple piece connectors have also been devised as shown in the above '104 patent.

However, although most such devices may be suitable at providing strain relief to the inserted wire, their construction, and particularly their flexible finger component, is such that they are unable to also seal around the wire and provide weather protection in order to prevent moisture from passing into the box. One exception to this is the '104 patent which both seals and provides strain relief. However, this patent seals via a grommet that is compressed between a connector body and a threaded end cap is provided as an extra part in the normal fashion. Hence, to effect a seal according to this patent, more than simply inserting the wire through the strain relief connector is required. Instead, the user must also assemble the grommet into the connector body located on one side of the enclosure and tighten the threaded end cap onto the connector body, this threaded end cap being on the other side of the enclosure.

Such ready access to both sides is not always possible due to the tight constraints and limited room in typical electrical enclosures. Furthermore, such assembly and installation steps increase the expense of using this connector. Additionally, the end cap itself is bulky and extends into the interior of the enclosure which may either interfere or cause interference with other devices therein. Also, the grommet size limits the range of wire gauges that can be used with this connector and still seal and seat properly.

DESCRIPTION OF THE RELATED ART

A device which may provide weather protection, but has many other shortcomings is shown in FIG. 1. Reference numeral 10 generally indicates a two-component (a skeleton with a flexible outer membrane) grommet 10 comprised of having a wide tubular sleeve wall (shown as 20 in FIG. 4). The tubular sleeve wall 20 expands radially outwardly at either ends (shown as 22, 24 in FIG. 4) into a top and a bottom circular extensions (12, 14) in an inverted umbrella-like manner and also expands radially inwardly at either ends into central portions (16, 18) to define a small aperture 18 in the center.

As can be seen in FIG. 1 and FIG. 2, the top circular extension 12 is divided by a circumferential ridge 22 into two portions, an inner middle section 24 and an outer peripheral section 26, where the outer peripheral section 26 has a smaller outer diameter 27 than the diameter 28 of the bottom circular extension 14. The perimeter 32 of the surface of the outer peripheral section 26 of the top circular extension 12 is partly broken by a couple of tabs 30, and 30'. The surface of the inner middle section 24 is sloped downward toward the opposite side extension 14.

The surface of the bottom circular extension 14 is also sloped downward from a second ridge 23. The second ridge 23 divides the bottom circular extension 14 as well. As mentioned above, the outer peripheral portion 27' has a much larger outer diameter than the top circular extension diameter 28. The bottom ridge has an inner middle portion 25 that may be either flexed toward or away from the top circular extension 12.

Referring now to FIG. 3, the inner skeleton portion 32 which includes the two tabs 30 and 30' is shown. As can be seen, the skeleton portion 32, which is substantially tubular along its base body 34, is overmolded with a rubber material described above. This skeleton portion 32 has an outer flange 36 on one end 38. Along the inner circumference 37 of this flange 36 are upright walls 35 that extend perpendicular to the flange 36 (i.e. extend parallel to the cable 48 as shown in FIG. 6). At the distal ends 39 of these walls 35 remote from the flange 36 are inwardly directed pie-shaped fingers 33, 33', & 33" that curve back towards the flange 36. The base body 34 is broken between the narrower portions 31, 31' which supports the two tabs and the wider portions 41, 41' which support the pointed pie fingers 33, 33', & 33". The flange 36 is also shown to have small holes 43 so that the rubber coated relief can be formed around the flange 36.

Referring now to FIG. 4, a cross section view along the line A-A of FIG. 3 is shown. The cross section view more clearly shows that the pie fingers 33, 33', & 33" extend from the side wall 35 and are directed downwardly toward the flange 36. Because the pie fingers 33, 33', 33" are curved outwardly at a distance away from the flange 36, the flange 36 itself does not retain the inserted cable with much force. In fact, due to the distance between the flange 36, and the base 39 of pie-shaped fingers 33, 33', 33", over time, the cable retention force will be diminished considerably.

Further, the pie fingers 33, 33', 33" extend from the wall's distal end 39. The pie fingers 33, 33', 33" flex from their bases at the distal end 39 due in part to their wide width, thus resisting greater deflections or flexibility. This makes insertion and pullout for reusage very difficult as well. Further, because the pie fingers 33, 33', 33" stem from the tubular body distal end 39, the fingers present difficulty in removal of an inserted cable. In use, once an extreme force is utilized to pull out the cable, the device, in effect, becomes very difficult to reuse and thus rendered useless. Also, the side wall 35 extends about even with the wall catches (circumferential ridge) 22. This all leads to the design thickness being bulkier, which could cause interference with other parts in the box.

Additionally, the tips or apex 44 of the pie fingers 33, 33', 33" are quite spread away from each other and away from the center, leaving a large central gap 45. Due to this gap 45, and the size of the device itself, the design fits only within certain standard opening sizes. In fact, these devices are not manufactured for non-standard sizes. Further, due to the wide gap 45 as mentioned above, and the fact that the tips 44 of the design do not extend to the center, there is only a limited resistance to an inserted cable. Also, because of this gap 45, only large size cables can engage fingers 33, 33' and 33". And thus, this design is useful for only a limited range of cable sizes. Hence, only when the cabling begins to flex will the fingers of the design provide pull-out resistance (it will, however, still seal the cable due to the stretching of the overmolded material). Thus, the type of cable cross-sectioned shape of cable and its gauge that can be used is limited for the device. Further, as can be seen in FIG. 4, the thickness of each pie finger 33, 33', 33" stays constant throughout, so that the flexibility will mostly occur at the base portion.

The cross section view also shows that only the inner middle section 24 of the top and the inner middle portion 25 of the bottom are supported by the pie fingers 33, 33', 33" and the flange portions 36 of the skeleton portions. The outer top extensions 26 of the top portion and the bottom extension 27 of the bottom portion are not supported by the skeleton and are separated by a space region 11 reserved for both sides 46, 47 of the wall 48 as shall be shown in the following FIGS. 5 and 6.

As can be seen in FIG. 4, the device has two central portions 16, 18 of which the central portion 18 encompasses an open aperture characteristics. Although the central portion 16 of the design is originally intact till pierced, the outside dome 14 of the device comes with a hole in it, its central portion 18. Thus, it is only the inside depression that remains intact. In practice, moisture and debris can collect inside the device via this hole which is not desirable at all. Thus, the device can not be used as a plug due to the device having two walls.

As can be seen in FIG. 5, the outer peripheral portion 27' abuts the one side of the box with the walls extending out of the box. The cabling is then pushed through the device from outside the box as seen in FIG. 6. Because of the finger's position distanced away from the flange 36 and its angle, the cable insertion is made difficult according to the design. As can be seen in FIG. 5, an installer presses the smaller top extension side 12 from the inner side 46 of the wall 48 to click and fix the grommet 10 into the wall aperture 49. As can be seen in FIG. 6, once the grommet 10 is in place, the installer now needs to focus on the outer side 47 of the box to insert a cable 48 into the central portion 16.

Although the grommet 10 of the device may be weatherproof, because the cable is supported directly by only the two flexible outer extensions, and no rigid skeleton, the connector does not provide for stability. Further, as discussed above, the installer is forced to use two sides of a box or a wall (to install the grommet first, and then to install the cable on the other side). In tight spaces, or a wall where other side is not easily accessible, such installation can be frustrating.

SUMMARY OF THE INVENTION

It will therefore be seen that the present invention provides a connector for non-metallic sheathed cable that is of one piece construction and adapted for ready application to a box outlet opening utilizing the snap fit connection that has been described and illustrated, without requiring any special tools to apply the connector to the box or cable to the connector. The connector is free of clamps and other similar types of mechanical connecting devices, and no clamp acting on the cable end is required within the box in which the cable end extends. A further embodiment of the invention provides a wire connector comprising a single unit thereby avoiding the situation where the installer must field assemble or tighten multiple components together in order to complete the installation.

One embodiment of the invention provides for a connector that readily accepts both oval and round non-metallic sheathed cables with equal facility, and permits a ready sliding action on the cable end into the box. Movement tendencies of the cable in the opposite direction are immediately halted by the collet like closing action of the connector jaws on the cable.

Yet a further embodiment of the invention is to provide a liquid-tight, strain-relief cord connector that also helps isolate and protect the wire from the sharp edges of the knock-out or opening through which the wire passes. Another embodiment of the present invention also provides a connector that not only provides strain relief, but also seals the perimeter around both the wire and the enclosure or knock-out opening through which the wire passes. The present invention also provides a connector where the strain relief and the sealing characteristics occur automatically upon wire insertion and do not require any secondary operation or installation step which would prolong the installation process.

Yet another embodiment of the invention provides a connector that is not bulky and does not project significantly from either side of the box so as to eliminate any chances of interference. Still another embodiment of the invention provides a connector that is sized slightly bigger than the opening into which it will fit. Another embodiment provides a connector that can accommodate a variety of different cord gauges without the need for the installer to keep different connector sizes in store.

A preferred embodiment of the present invention provides for very little gap center. As the tips or apex of the fingers extend closer to the center and to each other, there is very little gap between these tips and they form a tighter circle between them. A further preferred embodiment of the present invention provides for easier cable insertion by having the fingers angle away from the flange. Yet another preferred embodiment of the invention provides for higher cable retention force, because the fingers are curved inwardly, not outwardly, and cable pull-out is resisted better by the design of the preferred embodiment.

A preferred embodiment of the present invention provides for fingers which flexes at its mid-region and not at its base or at its tip with fingers extending from a mid-region of the wall, or from the region of the wall closest to the flange, not from the wall's distal end. Further, a preferring embodiment is provided wherein a mid-region of each finger is slightly reduced in thickness or each finger is perforated so that the finger will flex at a mid-region and not at its base.

A preferred embodiment provides for utilization with non-standard opening. In other words, a typical ¾ inch fitting actually requires a larger diameter knockout. Same with a typical ½" fitting, it requires a larger than ½" hole. However, with the present invention, the operator does not need to drill a larger hole, but instead, can actually drill a ¾ inch opening for a ¾ inch fitting. Another preferred embodiment is provided that has a lower profile where the invention fingers extend inwardly from a mid-region of the wall. Also, according to the invention, the wall does not extend as much as the wall catches do.

Additionally, a preferred embodiment that is reusable is provided by the present invention. Despite the higher cable retention properties of the invention, the invention seal can be removed from the cable and hence are re-usable (such as when a new cable is to be pushed through the box opening). Specifically, according to the present invention, to remove the invention device, a user would skew or pivot it on the cable so that it projects outward from the cable at a 45 or less degree angle rather than at its normal 90 degrees. This will cause the fingers to be mis-aligned with each other and hence enable the embodiment to be slid off the cable.

A preferred embodiment of the invention is provided where the product can be used as both a cable fitting as well as a plug. When used as a fitting, the cable will extend through device into the box. However, when the product has not yet been pierced by cabling, its seal remains intact and hence can be used as a plug to seal an unused opening. While the prior art design is also originally intact till pierced, one side of the device comes with a hole in it. Only one particular side of the depressions remains intact. Thus, moisture and debris can collect inside the prior art device via this hole which is not desirable at all. This is also due to the present invention having only a single wall whereas the prior art device has two walls.

A preferred embodiment of the invention is provided wherein the embodiment can have a broader cable range usage. The invention can be used for both thick power cabling as well as thin data cabling. This is because according to the invention, the tip or apex of each finger extends nearly to the very center of the fitting. There is only a tiny center circle made of the over-molded material that is removed from the invention when a cable is pushed through. Hence, any cable larger than this over-molded center will cause the perimeter of this opening to stretch around the wire as well as cause the fingers to flex. In contrast, the tips of the prior art design do not extend nearly to the center. Hence, for the prior design, the flexing of the fingers will be triggered only when a cabling of a particular size that is thick enough is inserted. Thus, only a particular cabling of certain thickness will begin to trigger the flexing of the fingers which in turn will provide pull-out resistance (the prior art device, however, may still seal the cable due to the stretching of the over-molded material, but not effectively provide pull-out resistance).

Such inventive features could be provided in a preferred embodiment of a cord connector consisting of a pliable shell having a wire passageway therethrough. Adjoining this shell is a more rigid skeleton also configured with a wire passageway therethrough. This skeleton incorporates deflectable appendages which are deflected by the passage of a wire through the wire passageway. Further, these deflectable appendages restrict the removal of the wire back through the wire passageway in the opposite direction, whereby the pliable shell seals around the wire in the wire passageway while the skeleton provides strain relief to the wire in the wire passageway.

These and other advantages of this invention will become apparent from the following detailed description, which, taken in conjunction with the annexed drawings, discloses the preferred embodiment of the invention.

BRIEF DESCRIPTION OF THE DRAWINGS

The invention will be more fully understood from the following detailed description taken in conjunction with the accompanying drawings which form a part of this application, wherein like numerals referred to like parts and in which.

DETAILED DESCRIPTION OF THE PREFERRED EMBODIMENT

Figure 13:
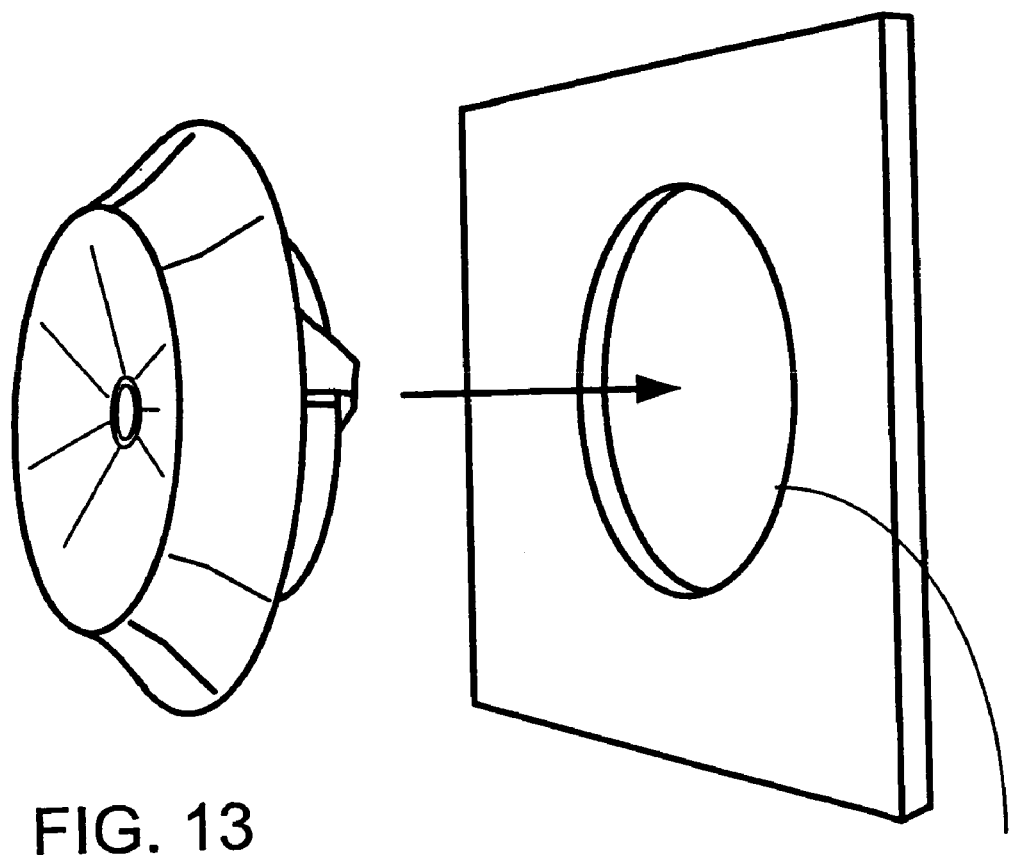
FIG. 13 is a graphical illustration showing the first step of the present invention embodiment being installed.
Figure 14:
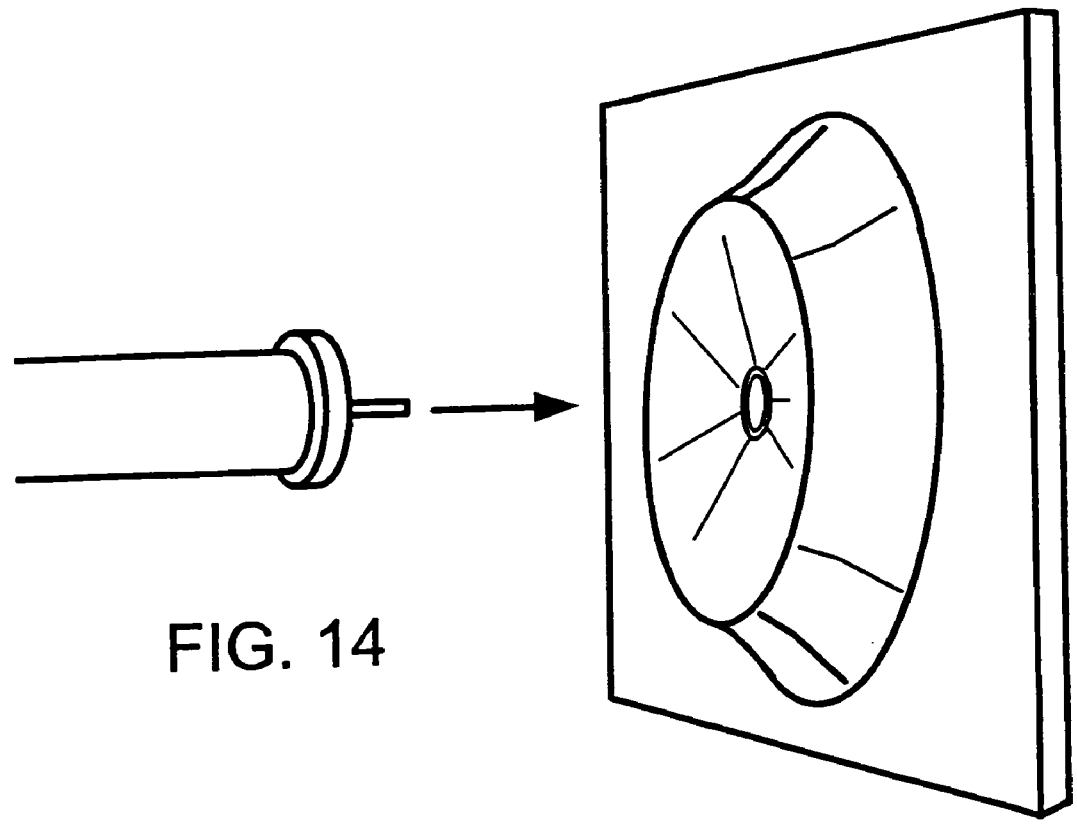
FIG. 14 is a graphical illustration showing the next step of installing the present invention embodiment.
Figure 15:
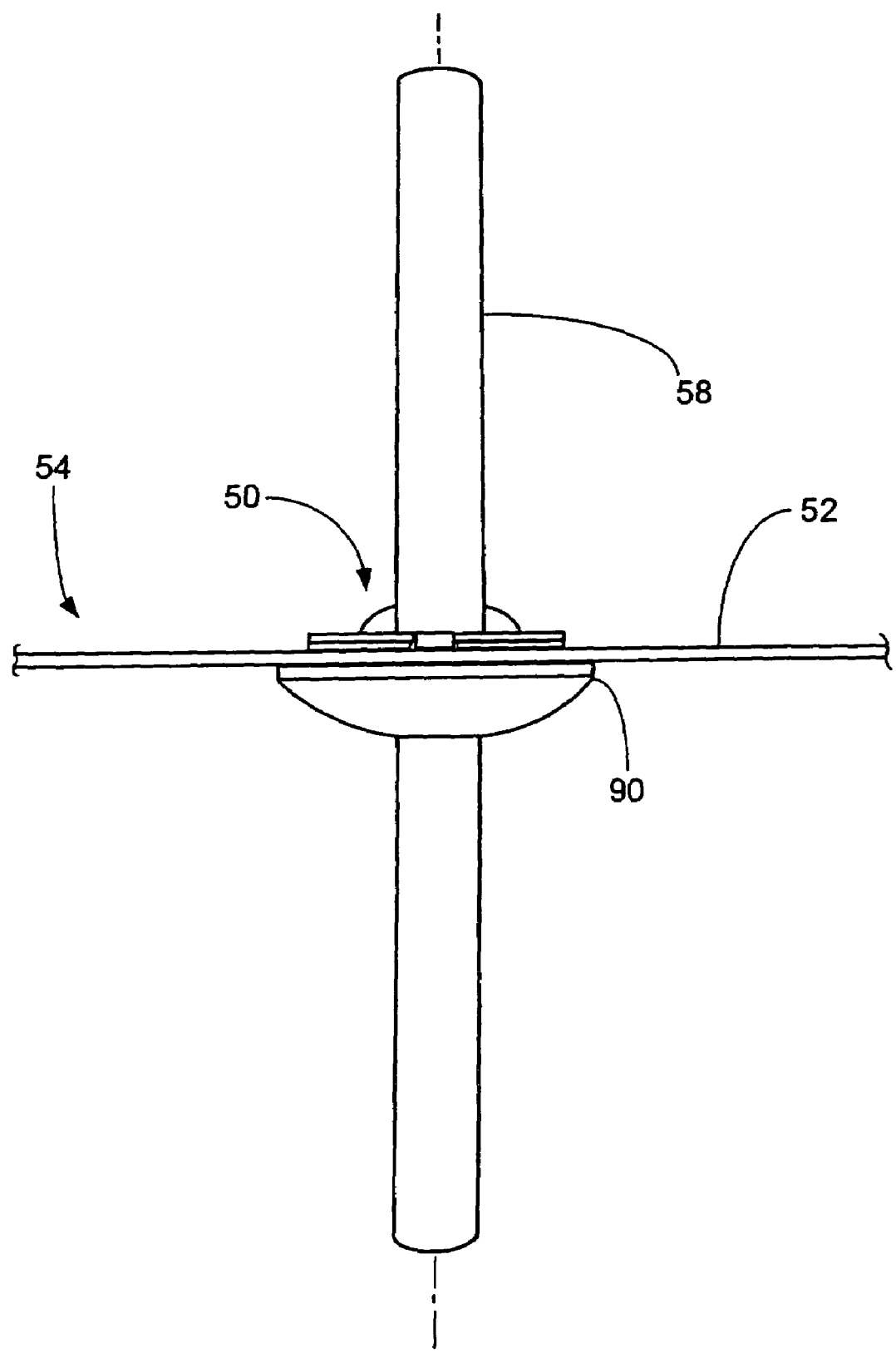
FIG. 15 is a plan view of the completed assembly of a preferred embodiment with a wire extending therethrough.

As can be seen initially in FIGS. 13, 14 and 15, reference numeral 50 generally indicates a preferred embodiment of the invention, that is shown applied to a wall 52 of a box 54 (of which only the indicated portion of wall 52 is shown), and specifically within the knock-out opening 56 that is formed in the box. The connector 50 is pushed into the knock-out or opening 56 from one side through an opening in wall 52 in the normal fashion. In essence, the connector 50 sandwiches the perimeter 57 of the knock-out opening 56 in the wall 52 between a pair of tabs 60, 60' on one side and a rubber-coated flange 90 (over-molded by the elastomeric circumferential ledge 84 as shown) on the other. Flange 90 acts as a stop measure, preventing connector 50 from being pushed completely through the wall opening 56. The outer surface of tab 60 is inclined to ease its insertion through the opening 56. In essence, connector 50 helps isolate wire 58 from the sharp edges of the perimeter 57 of the knock-out opening 56, thereby preventing the wire's insulation from being scraped off or otherwise removed during wire insertion and/or pulling while maintaining an inner box environment that is contaminant free.

Referring to FIG. 15, after the insertion of a cable, there is shown a button style cord connector 50 in place within the knock-out 56 in the wall 52 of an enclosure 54. Such enclosure 54 may be a typical electrical outlet box 54 or a load center. As can be seen, the wire or cord 58 extends through connector 50 positioned within the knock-out 56 in the typical fashion. Wire 58 is preferably a non-metallic sheathed cable but other cables are equally suitable for use with connector 50.

A wire passageway or a thin membrane position 98 may be present on the center of connector 50. While the FIGS. 13 and 14 show this passageway 98 as being centrally located, that need not necessarily be the case. Passageway position, when configured with an aperture, 98 is intentionally sized to be slightly smaller than the smallest wire 58 that is to extend therethrough. Passageway 98 is thus configured to expand in size so as to fit tightly against whatever size, type or gauge wire 58 may pass therethrough.

According to FIG. 13, the knock-out opening 56 is shown formed in a molded box 54 and this may be done with plastic, metal, sheetrock, or any other suitable materials in any manner usual and customary for a molded box or a wall with knock-out openings 56. While the box 54 may be of the molded plastic type, the invention is equally applicable to non-molded metal boxes, and specifically to the outlet openings of metal boxes as formed in any usual and customary manner for metal boxes.

Figure 7:
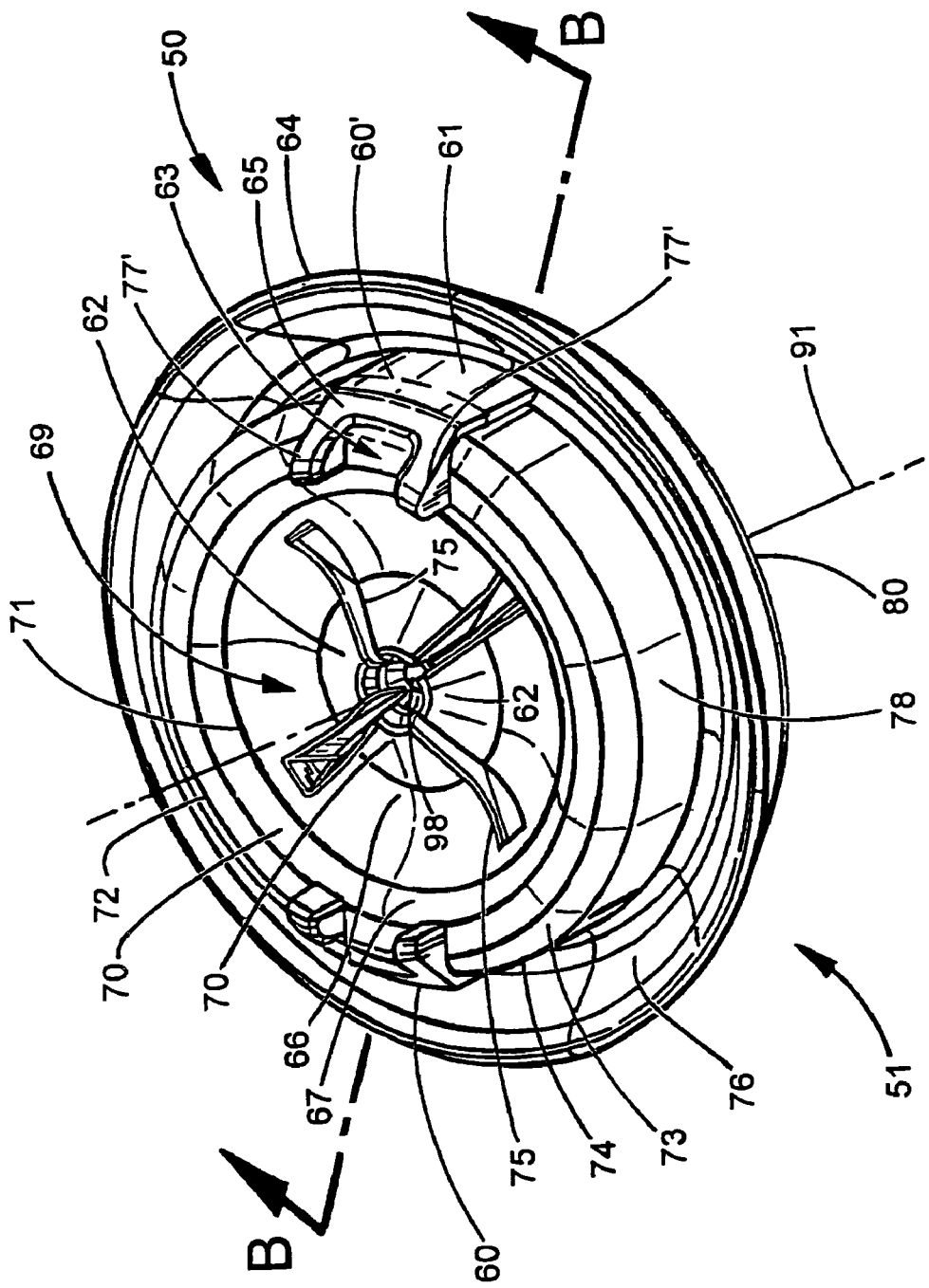
FIG. 7 is a perspective view of the completed assembly of the preferred embodiment as shown in FIG. 7.
Figure 9:
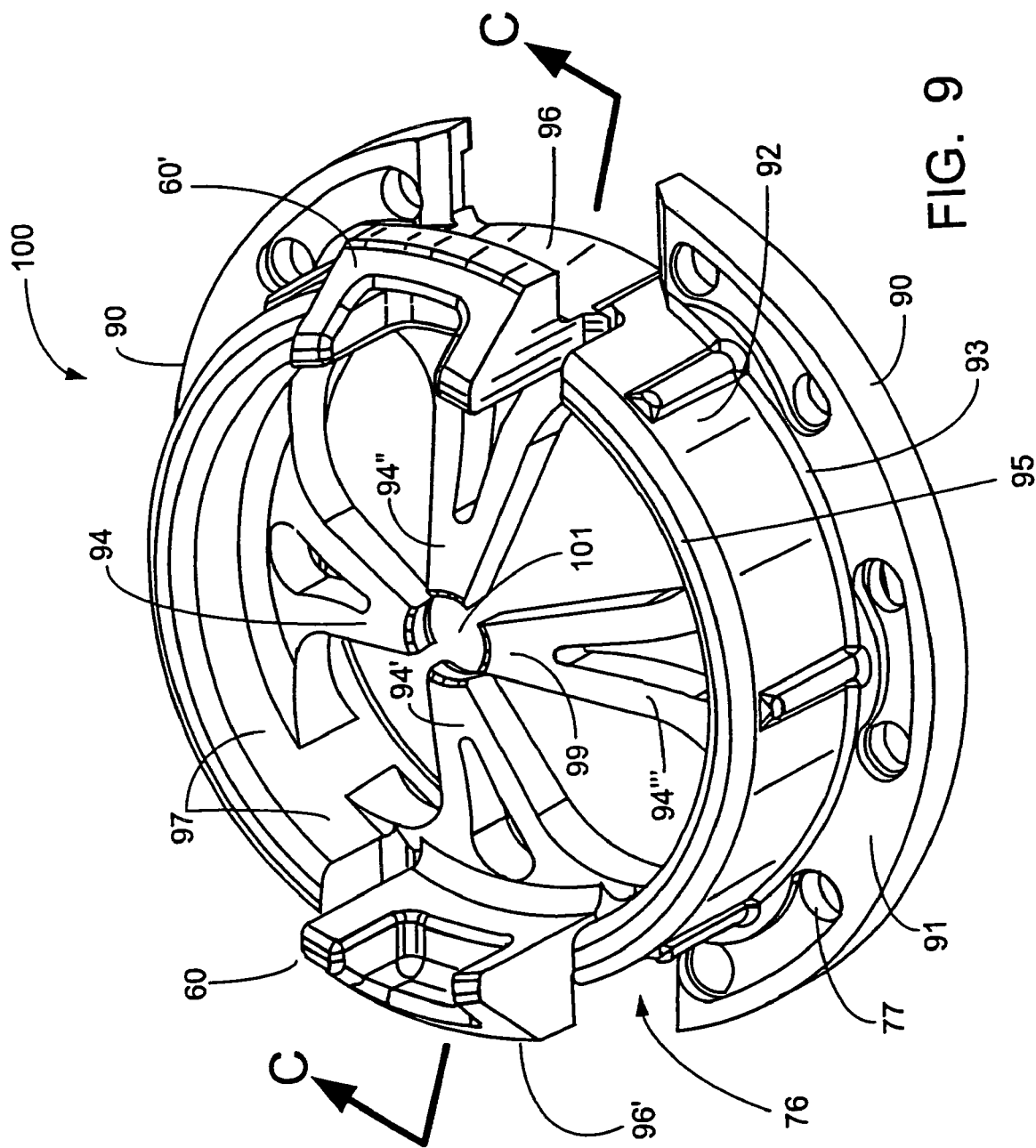
FIG. 9 is a perspective view of the exposed skeleton of the preferred embodiment of FIG. 7 with the overmold removed.

Referring now to FIG. 7, connector 50 is shown as consisting of two separate components, an outer shell body 51 and an inner skeleton portion 100 as shown in FIG. 9. The outer shell body 51 is made of a pliable elastomer that can stretch under a load. This shell body 51, and hence its undersized wire passageway position 98, thus expand around any wire 58 pushed therethrough. Because shell body 51 is constructed of a pliable material, it automatically seals around such wire 58 as it is expanded, thereby preventing moisture from passing along wire 58 and into the interior of the enclosure or box. Also, because of such stretchability or flexibility of shell body 51, a variety of different wire sizes can be accommodated by a single connector 50, there being no need to keep numerous connectors on hand depending on the wire gauge employed. Further, the pliability of shell body 51 not only helps connector 50 seal around wire 58, but such flexibility also enables connector 50 to seal around the opening or knock-out 56 in wall 52. Thus, connector 50 and more particularly shell body 51 provides a liquid-tight seal around both wire 58 and the knock-out in wall 52.

The connector 50 specifically comprises a substantially circular body 64 of segmented relation, having an inverted mushroom-shape with a top circular side 70 of a particular diameter 74 and a curvilinear surface. The body 64 also includes a bottom frusto-conic surfaced side 80 with a larger diameter 82. The curvilinear surface 66 of the top side 70 includes an upper circumferential ridge 72 from which the outer surface 73 slopes downward a short distance toward the outer perimeter 74. From the outer perimeter 74, a side stem wall 78 is provided which is parallel to the central axis 91.

The inner middle surface 71 of the top circular side 70 also slopes downward but in a slightly curvilinear manner toward the passageway position or the center aperture location 98. The center aperture location 98 may be provided with a ready-made small hole or it may also be formed with a thin elastomer membrane for a cable tip 59 to bore through with minimal resistance.

Starting from the upper ridge 72 of top side 70, the inner surface 71 is further defined by a set of opposed jaws 62 projecting inwardly toward the center location 98, wherein each jaw is separated from each other jaw by a slit 75, which may be covered by thin elastomeric membrane.

The set of jaws 62 are arranged concentrically about the central axis 91 of the body 64 and each comprises a collet finger 66 including a base 67 and a jaw head 68 to form a self acting collet 69 for receiving the end 59 of the non-metallic sheathed cable 58 that is to be applied to the box 54, and hold same against withdrawal from the box 54, as will be described hereinafter.

The outer perimeter 74 are formed to define curvilinearly contoured surfaces for cooperation with the box wall margin 57 in applying the connector to the box outlet opening 56, as will be described hereinafter.

The circumferential periphery 73 of the upper ridge 72 is interrupted by a pair of opposed triangular wedge-shaped tabs 60, 60'. Each tab 60, 60' may include a gap interval 63 between either ends 77, 77' for ease of molding during manufacturing process. Each tab 60, or 60' is over-molded on the bottom by a unitary column of abutting stem wall 61. Both the tab 60 and the abutting stem wall 61 delineate from the upper ridge 72 and rest of the stem wall 78 to allow separate flexible movement of the tab 60, 60' when being inserted into the opening 56 while the outer perimeter 74 remains constant.

Figure 8:
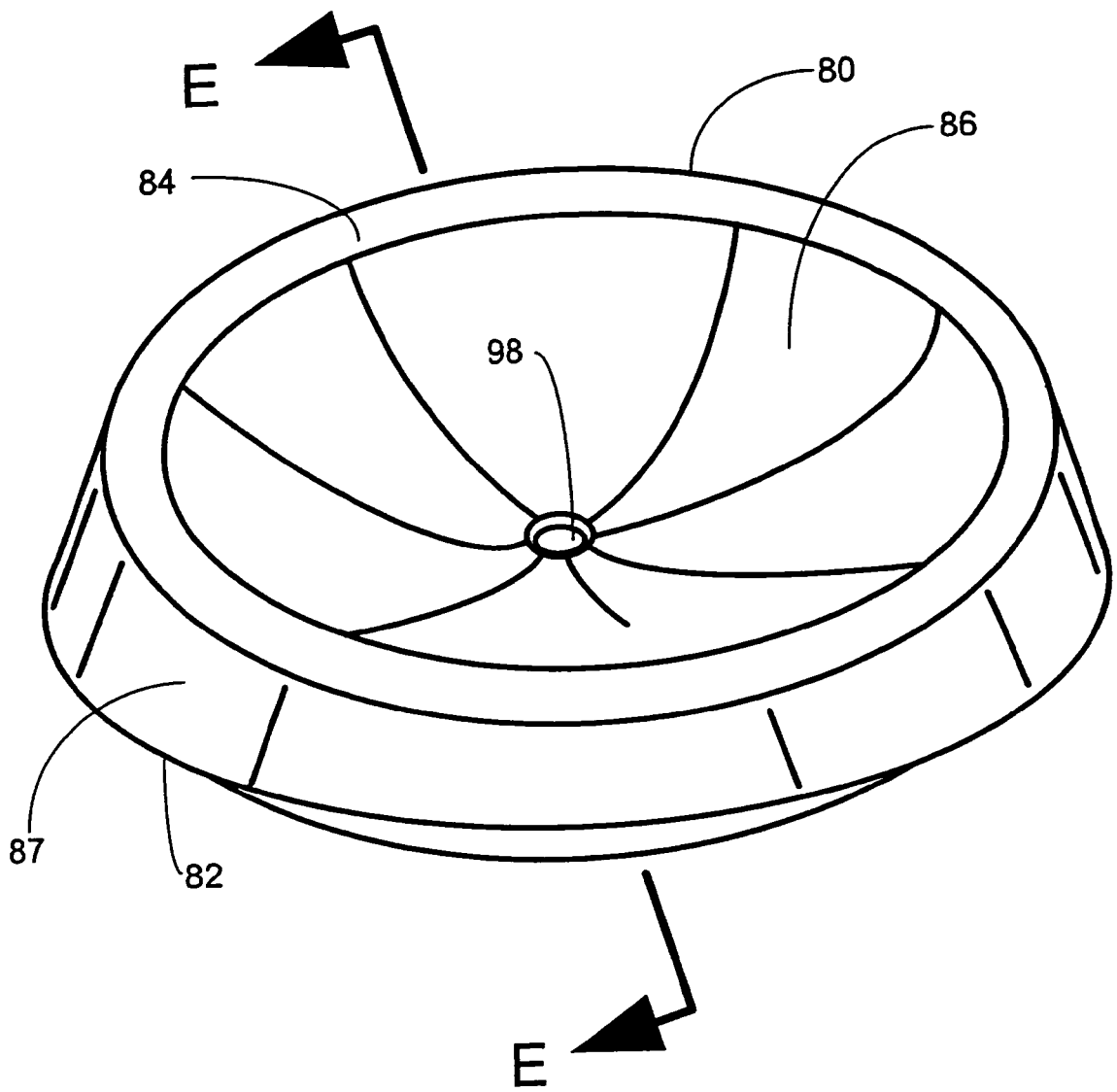
FIG. 8 is a perspective view showing the opposite side of the view shown in FIG. 7A of the completed assembly.

Referring now to FIG. 8, the bottom frusto-conic surfaced side 80 is shown. The side 80 of the shell 51 is of plain annular configuration and faces away from the set of jaws 62. Similar to the top circular side 70, the bottom frusto-conic surfaced side 80 also includes a lower circumferential ledge 84 defining a berm-like shoulder shape with an outer sloped surface 87 extending downward a short distance toward the outmost perimeter 82. The interior sloped surface 86 slopes in a curvilinear manner toward the opposite side of the center aperture location 90, namely the cable ingress passageway position 98.

Figure 8A:
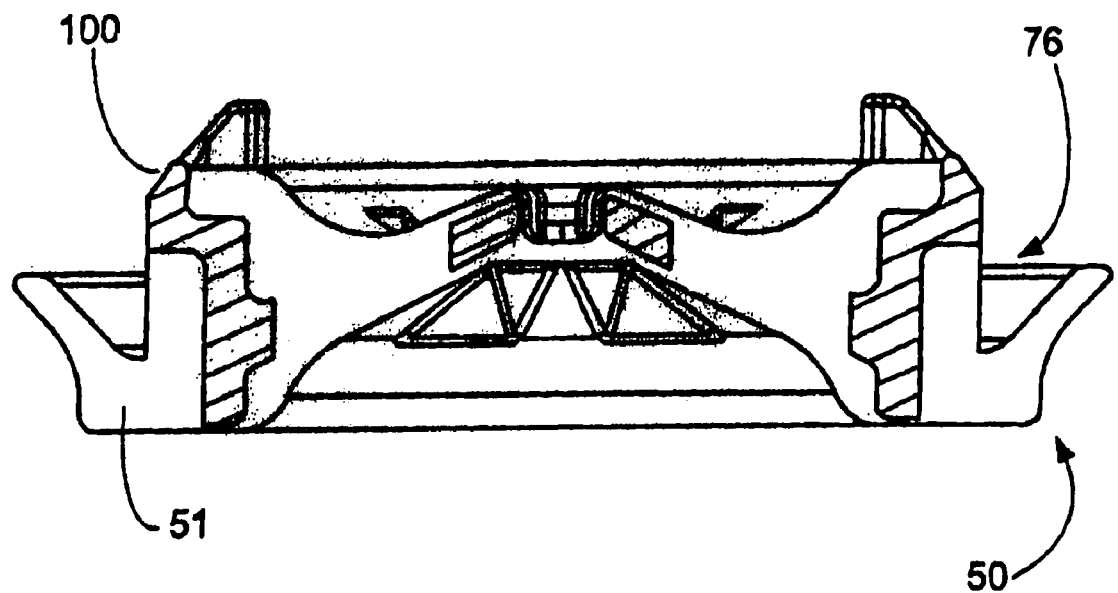
FIG. 8A is a cross-sectional view of the embodiment shown in FIG. 7 with the view taken along lines B-B of FIG. 7.

The outermost perimeter 82 of the bottom frusto-conic surfaced side 80 and the outer perimeter 74 of the top circular side 70 together define a seat 76 (Seen in FIGS. 8A and 9) in between which the box wall rim portion 57 that defines the outlet opening 56 is received to mount the connector 50 in the box 54, and specifically in its outlet opening 56.

The ring shaped shell body 51 and the set of tabs 60 are integrally connected; the device 50 is thus of an integrated construction and is preferably formed, although not limited to, from a suitable material of the polymeric type such as elastomer, rubber, plastic, nylon or the like. A preferred material is one that provides the desired resilient flexibility, self-lubricating and dielectric qualities, and corrosion resistant and non-metallic nature that are preferred for practicing the invention.

Figure 8B:
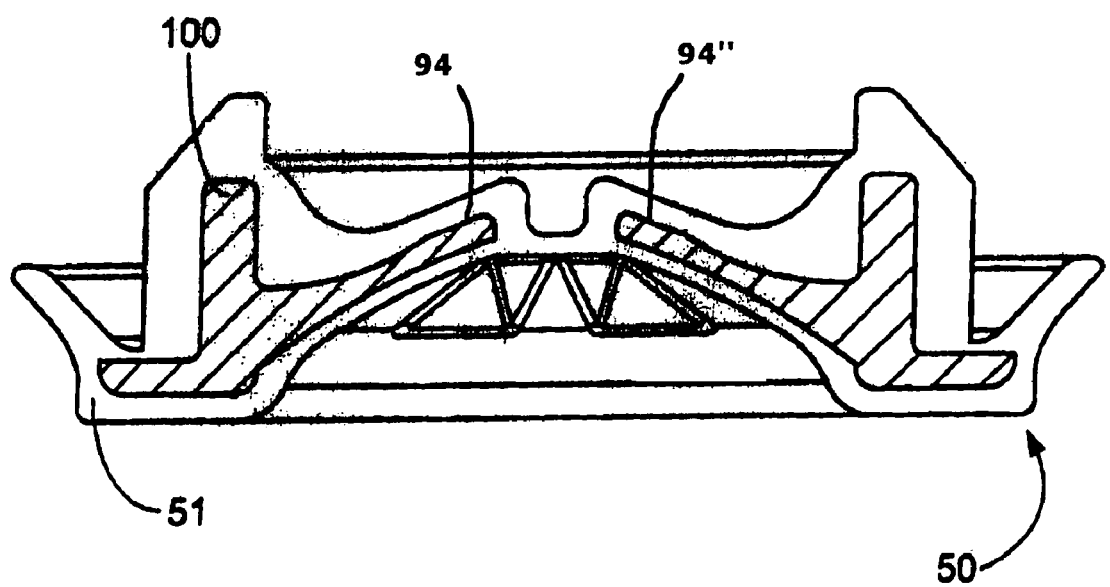
FIG. 8B is a cross-sectional view of the embodiment shown in FIG. 8 with the view taken along lines E-E of FIG. 8.

While shell body 51 provides wire sealing or liquid-tight capabilities, its flexibility alone may not be sufficient at also providing direct strain relief characteristics as pointed out with the prior art reference discussed above. Thus, as can be seen in the cross-sectional views, FIGS. 8A and 8B, skeleton 100 is employed within the shell body 51 to impart stiffness and rigidity to connector 50. Normally, the shell body 51 would be overmolded onto the skeleton 100 but other methods of manufacture are equally possible. Because flexible shell body 51 and more rigid skeleton 100 may be formed or molded together, they act in tandem as a single unit for the user to handle, even though these different components provide different functions to connector 50. Due to such over-molding, it may occur that these two components are fused or molded into a single integral unit, but this need not be the case as connector 50 will function just the same if these two components remain separate and operate independently after being combined together.

Now referring to FIG. 9, the skeleton portion 100 will be described. The skeleton portion 100 is made of semi-rigid to rigid material and extends across nearly the full diameter of shell body 51. Such skeleton portion 100 is shown as being arch-shaped so as to provide support and impart a domed or button shape to shell body 51. Other shapes for skeleton portion 100 are equally likely, such as flat or even slightly concave. By its construction, skeleton portion 100 transfers any wire withdrawal force from wire 58 itself through skeleton portion 100 and to wall 52. This force transfer helps retain connector 50 within the knock-out or wall opening 56 by compressing wall 52 even more so via tab 60 and flange 90. Such withdrawal force transfer to wall 52 helps protect the device within the enclosure 54 to which wire 58 is attached. Connector 50 also helps prevent wire 58 from being scraped or pulled along the edges of the knock-out.

Structurally, the skeleton portion 100 is generally a ring shape apparatus having a set of short distanced upright side walls 92. The side walls 92 are characterized by a bottom end 93 and a top end 95 and the walls 92 extend almost fully around in a circumferential manner except at the two disjointed sections of tab supporting walls 96 and 96'. Adjacent to the top end 95, and supported by the tab supporting walls 96 and 96', are two tabs 60 and 60'. Furthermore, the bottom end 93 has an outwardly directed flange 90 situated along most of its perimeter. Geometrically, the upright walls 92 adjoin the flange 90 at its inner circumference and the upright walls 92 extend perpendicular to the flange 90. The body side of the flange 90 defines segmented abutment surfacing 91 thereabout that forms part of seat that abuts against the outside surface of the box wall 52 when the connector 50 is applied to the box 54. The periphery of flange 90 include several apertures 77 to assist in integrating the over-molded elastomeric structure over the skeleton portion 100.

Figure 10:
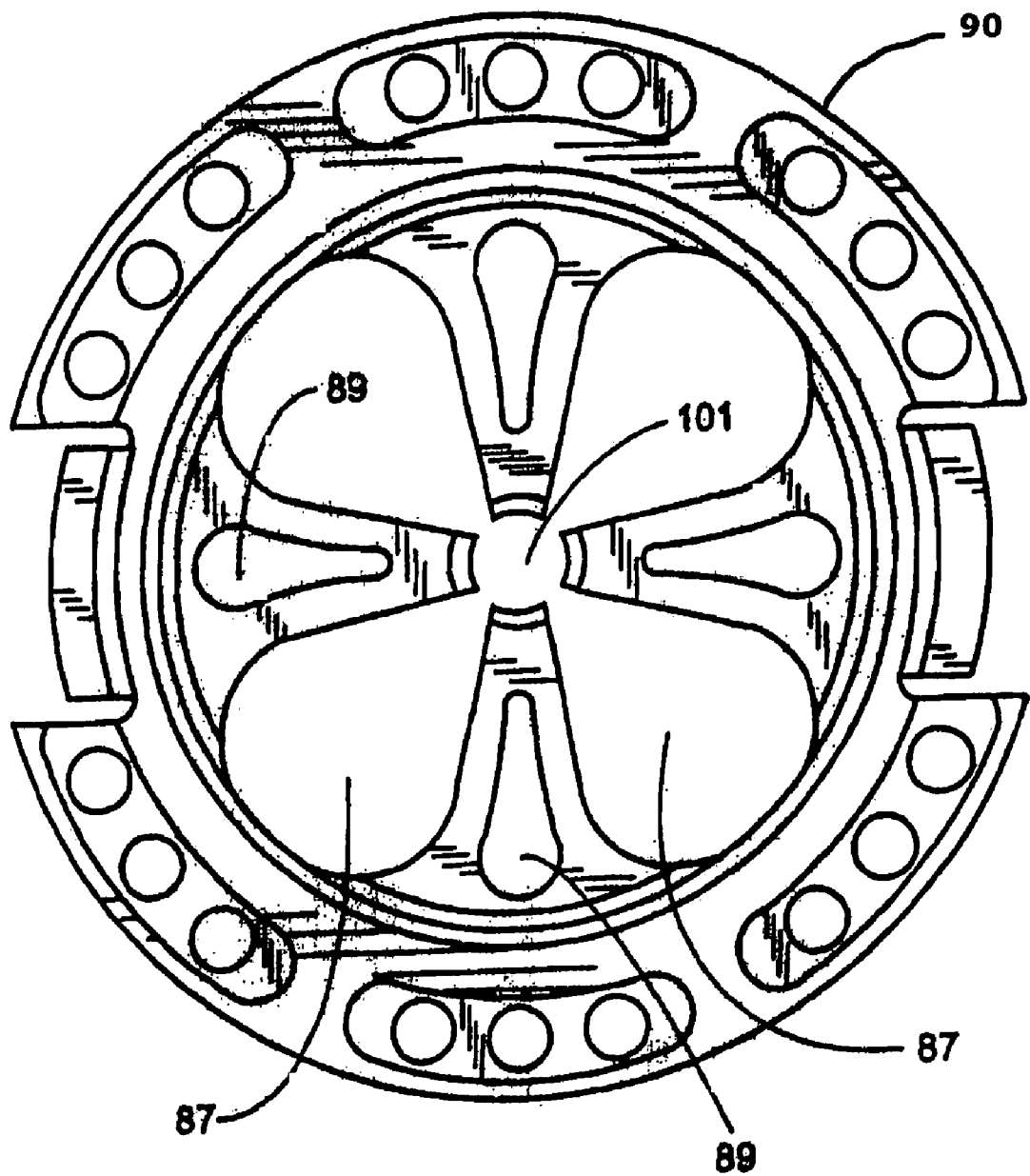
FIG. 10 is a top plan view of the exposed skeleton of FIG. 9 of the present invention.
Figure 11:
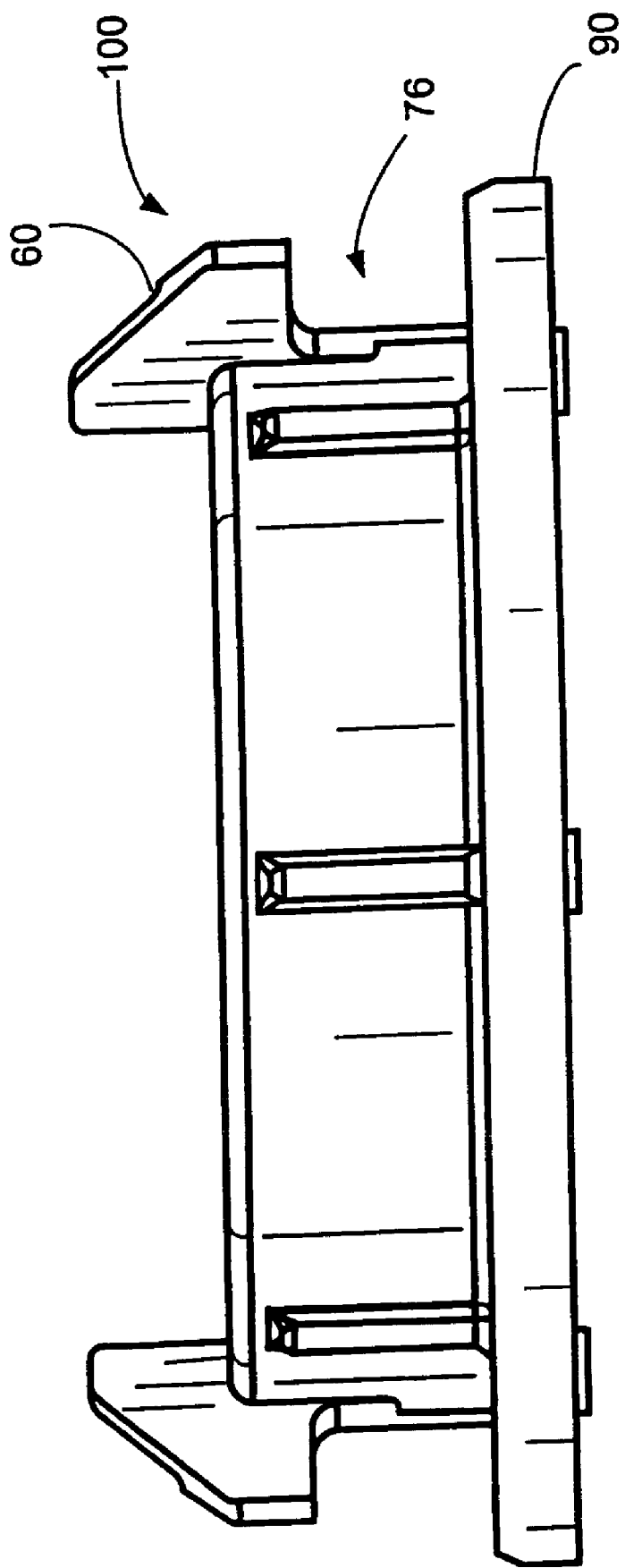
FIG. 11 is a side plan view of the exposed skeleton of FIG. 9 of the present invention.
Figure 12:
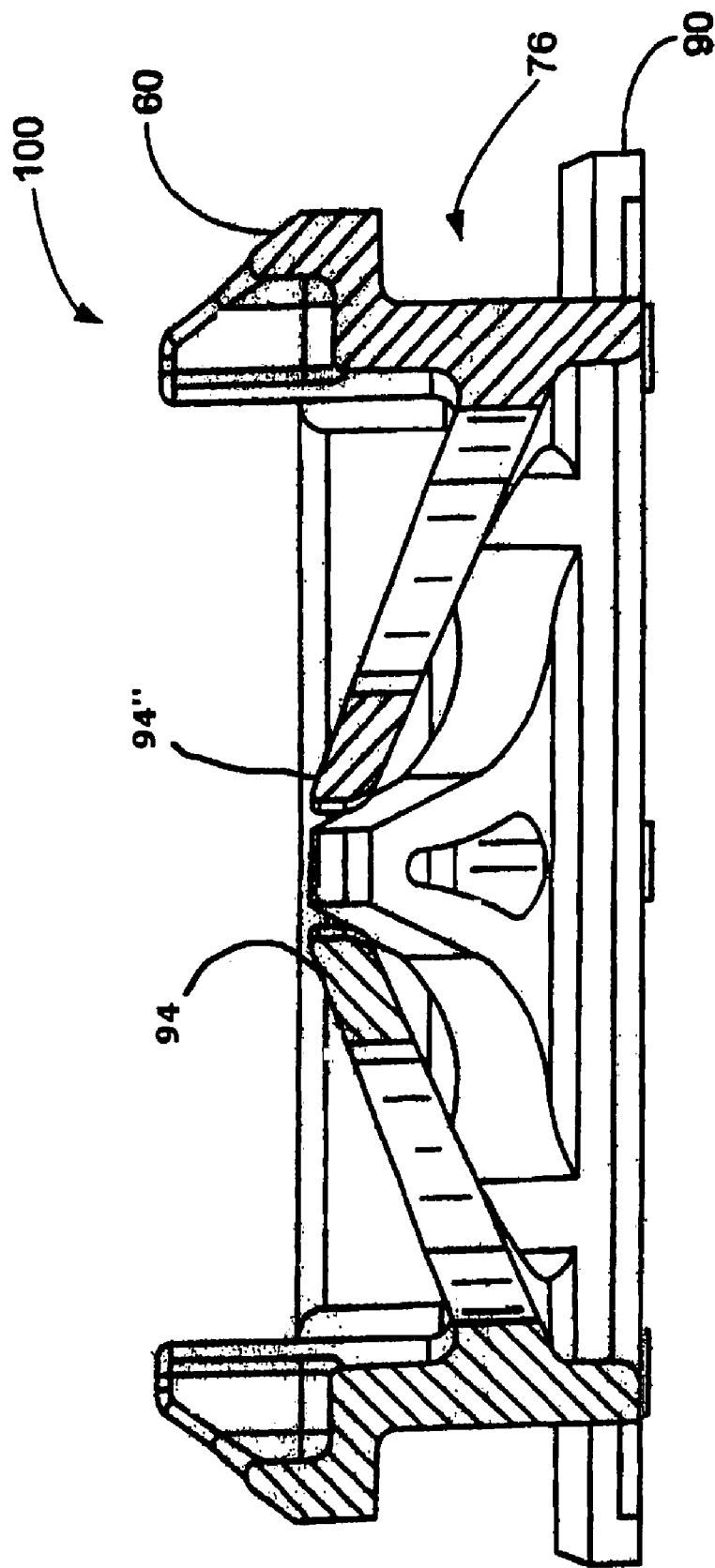
FIG. 12 is a cross sectional view of the exposed skeleton of FIG. 9 taken along the lines C-C of FIG. 9.

FIGS. 9 and 10 illustrate an inner finger type design for the above-mentioned collet function with this finger design incorporating a plurality of fingers 94, 94', 94", and 94''' having tips or apex 99 bordering wire passageway 101. In essence, at the interior side 97 of the side wall 92, at or near the bottom end 93 are four inwardly directed fingers 94, 94', 94", and 94''' curved upwardly away from the flange 90. Because the fingers 94, 94', 94", and 94''' are angled towards the inside of the box 54 (i.e. in the direction of cable travel) this makes it easier to push the cable through. Also, because the fingers 94, 94', 94", and 94''' are curved inwardly, not outwardly, cable pull-out is resisted better by the design.

Also, these fingers 94, 94', 94", and 94''' extend from a mid-region of the side wall 92, or from the region of the wall closest to the flange 90, not from the wall's distal top end. Because the fingers extend inwardly from a mid-region of the wall 92, and the wall does not extend as much as the wall catches do, this configuration leads to the connector device 50 having a low profile. Additionally, the tips or apex 99 of the fingers 94, 94', 94", and 94''' extend closer to the center and to each other, there being very little gap 101 between these tips. Therefore, the tips 99 form a tighter circle between them. Further, a mid-region of each finger 94, 94', 94", and 94''' is slightly reduced in thickness (as can be readily seen in FIG. 8B) and/or each finger is perforated with perforations 89 (as can be seen in FIGS. 9 and 10) so that the fingers 94, 94', 94", and 94''' will flex at a mid-region and not at its base. As a result, the jaws 62 flex from a mid-region, not from their base, this being accomplished via the reduced thickness or perforations of the mid-region of the fingers as mentioned above.

These fingers 94, 94', 94", and 94''' and more particularly distal ends 99 are deflected when wire 58 is pushed through passageway 101. Distal ends 99 have a more pin-point interaction with wire 58 than curved edges above, but nevertheless, fingers 94, 94', 94", and 94''' likewise become wedged against the outside of wire 58 when an attempt is made to pull wire 58 back out of connector 50. The gap or the circular spacing 101 between fingers 94, 94', 94", and 94''' permit them to flex as needed. These fingers 94, 94', 94", and 94''' also apply what might be said to be a direct linear force to wire 58 with such force also having an axial component thereto. As indicated above with respect to the vortex design, the act of inserting wire 58 within passageway 101, and particularly any attempted removal therefrom, causes greater holding power of connector 50 within wall 52 as well as strain relief properties for wire 58.

As can be seen, no gland nut or locknut is required to secure and seal wire 58 within wall 52 via button connector 50. Also, the sealing around the wire 58, the greater holding power of the connector within wall 52 and the strain relief for the wire all occur automatically upon the insertion of wire 58 into and through passageway 101. Furthermore, the initial insertion of connector 50 within wall 52 further creates a seal around the enclosure opening 56. Connector 50 also permits quick and easy installation and it does not have any components that require field assembly or which project excessively from either side of wall 52. Instead, connector 50 is just slightly larger than the opening 56 itself. Further, while connector 50 comprises an outer shell 64 and an inner skeleton 100, their assembly occurs at the factory and not in the field. Hence a single assembled unit 50 is employed by the installer who simply snaps connector 50 into an opening in wall 52. No tools are required to install connector 50 which also greatly simplifies this process. The body 64 is formed with a plurality of over-molded marginal slots 75, with the respective slots 75 and their thin elastomer membrane, extending substantially perpendicular to the axis 91 of the connector 50, longitudinally thereof, and each slot 75 being centered on the respective jaws 62 (see FIG. 7). Slots 75 are of sufficient depth, radially of axis 91, to subdivide jaws 62 of the body 64 into segments for flexibility and extend substantially into jaw heads 68.

Despite the higher cable retention properties of the current invention, the seal can be removed from the cable and hence are re-usable (such as when a new cable is to be pushed through the box opening). To remove the connector 50 that is already installed, the user would skew or pivot it on the cable 58 so that it projects outward from the cable 58 at a 45° or less degree angle rather than at its normal 90°. This will cause the fingers 94, 94', 94", and 94'" to be mis-aligned with each other and hence enable the connector 50 to be slid off the cable 58.

Returning to the skeleton portion 100, the fingers 94, 94', 94", and 94'" are separated by cross spaces 87, which thus define the sides of the respective fingers 94, 94', 94", and 94'". While the fingers 94, 94', 94", and 94'" are subdivided by the respective slots 75 when over-molded, the resulting jaws 62 are integral with the body segments 64 adjacent same, so that connector 50 is of one piece construction. However, the resiliently flexible nature of the material from which connector 50 is made accommodates flexing of body segments 64 radially of axis, which facilitates the snap fitting of the connector to the box, and permits the connector 50 to be applicable to a wide range of knock-out tolerances. In other words, with the design of the invention, the opening 56 to be made in the box 54 can be a non-standard opening. A typical ¾ inch fitting actually requires a larger diameter knockout 56. Same with a typical ½" fitting, it requires a larger than ½" hole 56. Thus, with the current invention, the installer can actually drill a ¾ inch opening 56 for a ¾ inch fitting.

Further, the connector 50 can be used as both a cable fitting as well as a plug. When used as a fitting, the cable 58 will extend through the connector 50 into the box. However, when the connector 50 has not yet been pierced by cabling, its seal (thin elastomer or similar membrane) remains intact and hence can be used as a plug to seal an unused opening 56. While the design according to the current state of art is also originally intact till pierced, please note that the dome of the device according to the current state of art comes with a hole in it. Only the one particular side depression remains intact. Thus, moisture and debris can collect inside the device via this hole which is not desirable at all. This inventive feature of the present invention is also due to the connector 50 having a configuration of only a single wall whereas the device according to the current state of art requires two walls.

Figure 1:
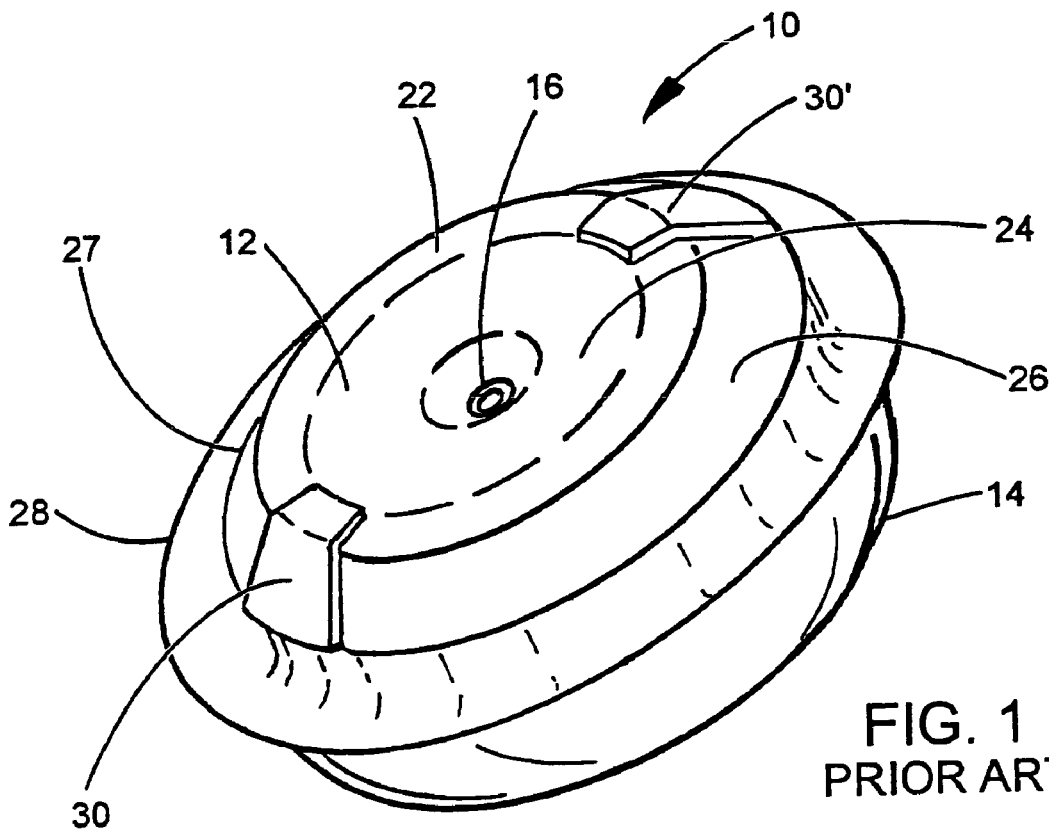
FIG. 1 is a top perspective view of a prior art device.
Figure 2:
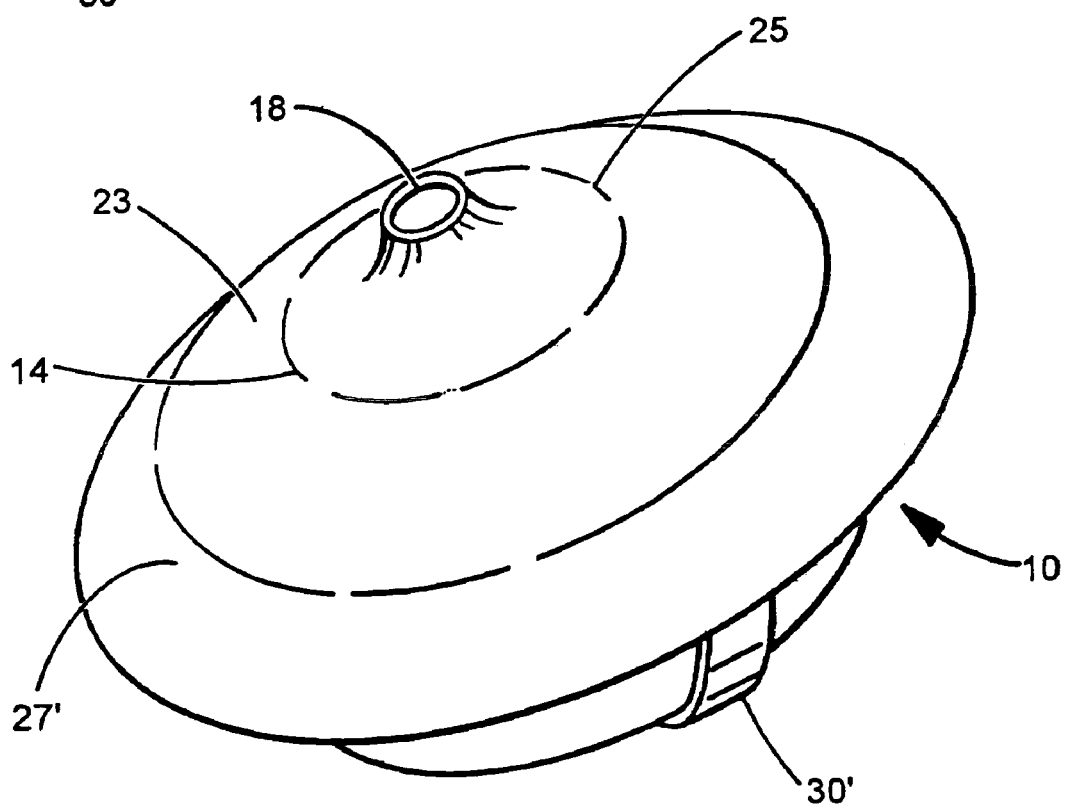
FIG. 2 is a perspective view showing the opposite side of the device as shown in FIG. 1.
Figure 3:
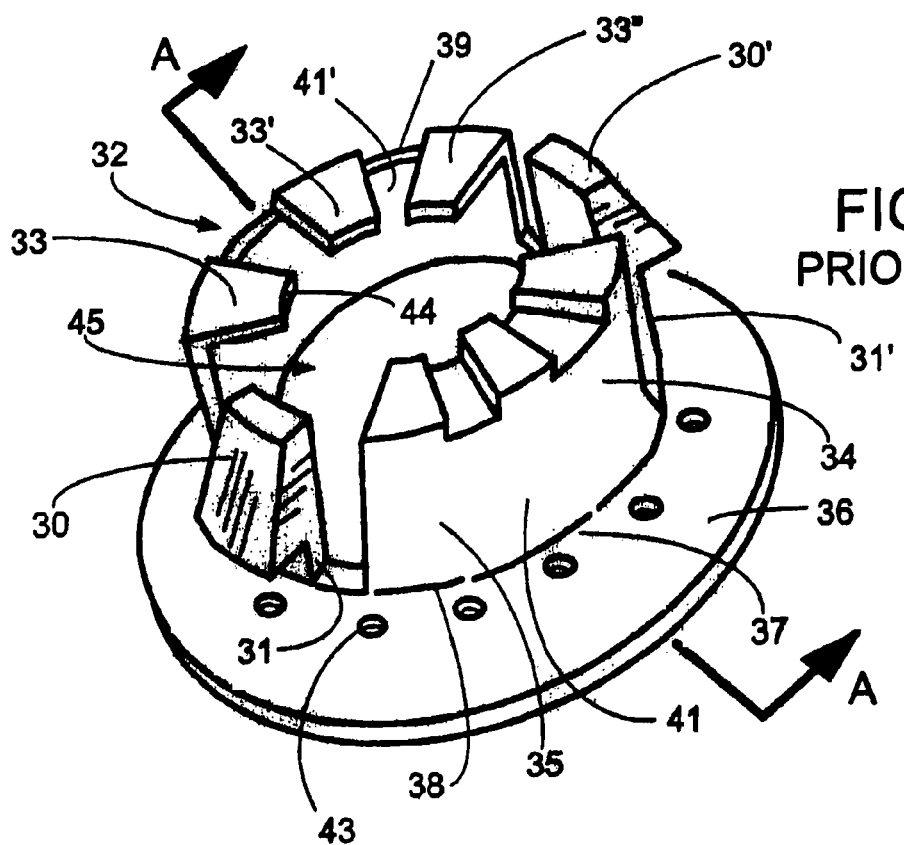
FIG. 3 is a top perspective view showing only the inner skeleton of the device as shown in FIG. 1.
Figure 4:
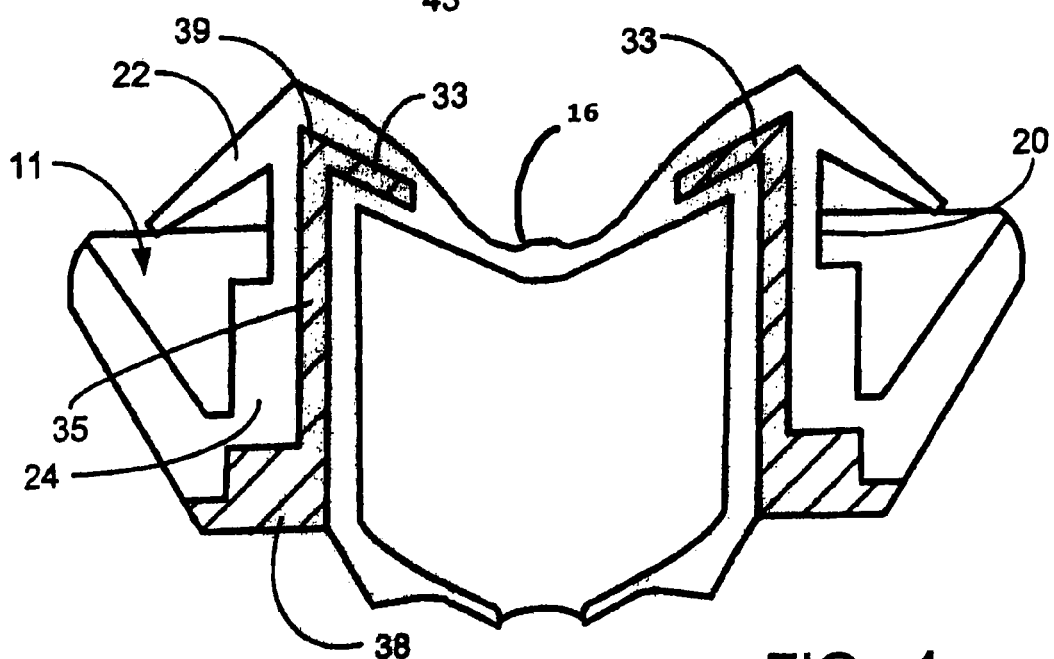
FIG. 4 is a sectional view of the device as shown in FIG. 1 along the A-A plane.
Figure 5:
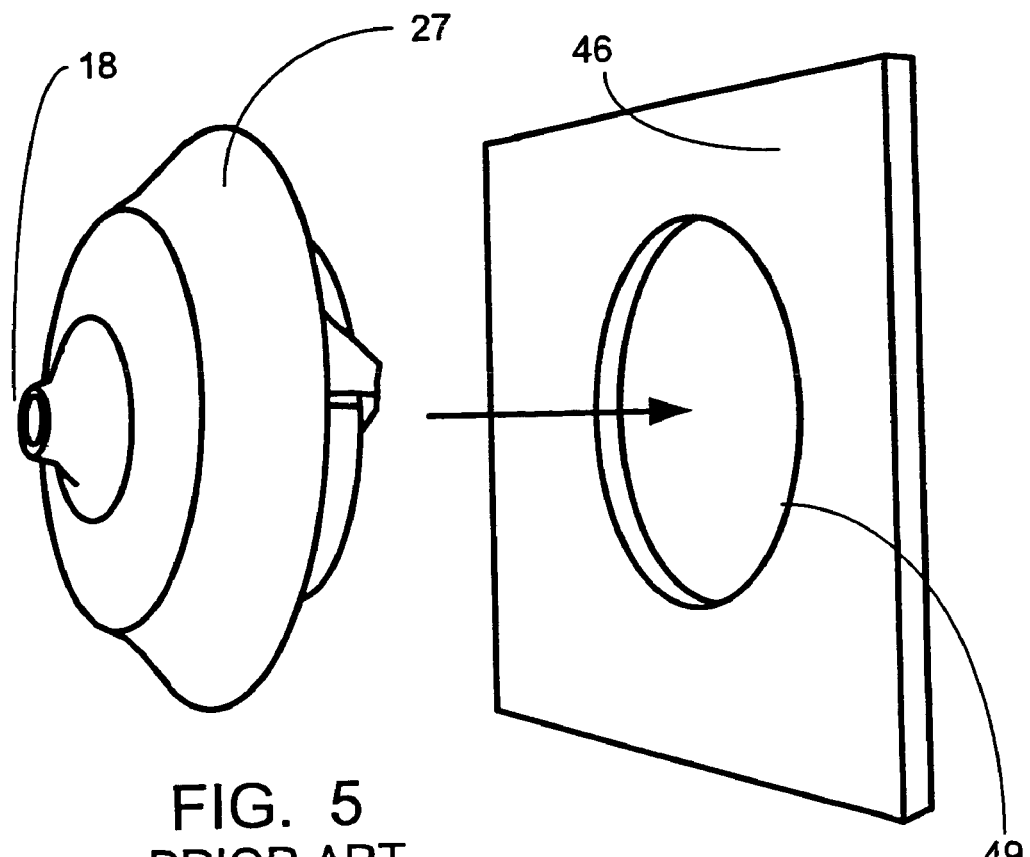
FIG. 5 is a graphical illustration showing an initial step in installation of the prior art device as shown in FIG. 1.
Figure 6:
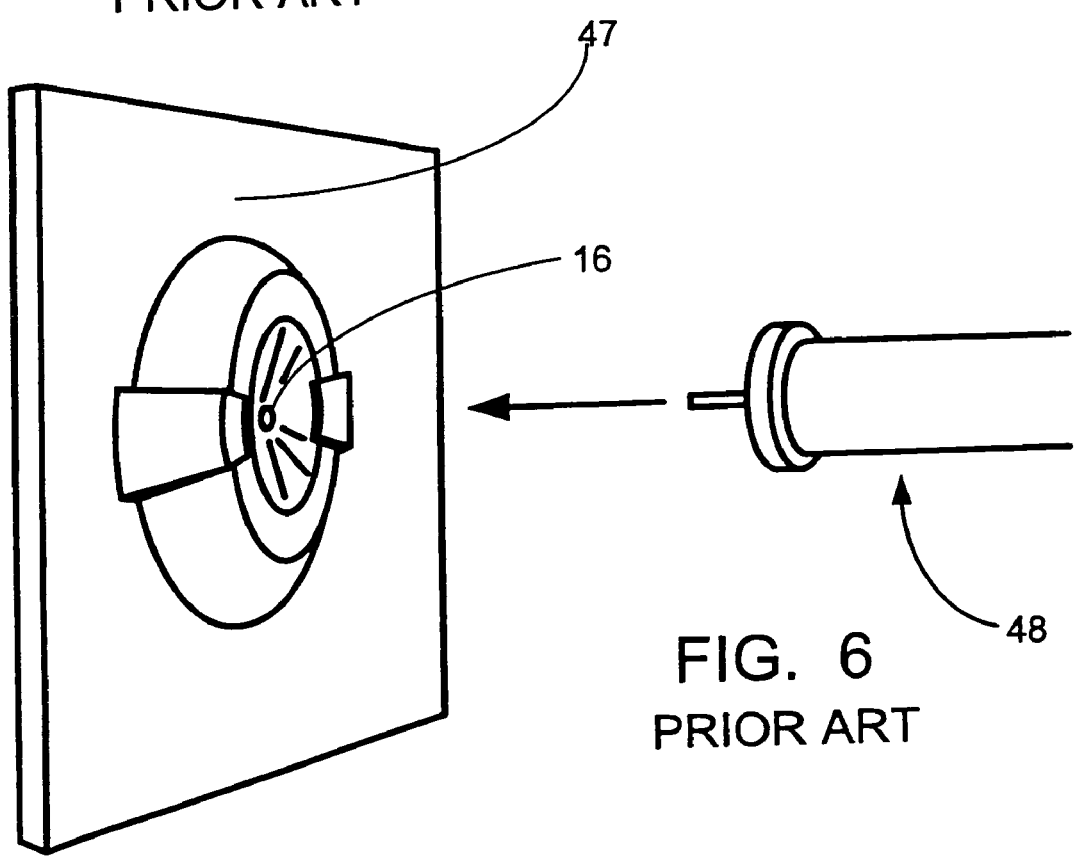
FIG. 6 is a graphical illustration showing the following step after the step shown in FIG. 5 in installing the prior art device shown in FIG. 1.

The connector 50 according to the present invention has a much broader cable range than the device of current state of art. The connector 50 can be used for both thick power cabling and thin data cabling as well as any other profile cabling such as a flat cross-sectional cabling. This is because in the connector 50, the tip or apex 99 of each finger 94, 94', 94", and 94'" extends nearly to the very center of the fitting 101. There is only a tiny center circle 101 made of the over-molded material that is removed from the connector 50. Hence, any cable larger than this overmolded center will cause the perimeter of this opening to stretch around the wire 58 as well as cause the fingers 94, 94', 94", and 94'" to flex. In contrast, the tips of the design of the current state of art do not extend to the center (see FIG. 3) and hence, only until the cabling can begin to flex the fingers 94, 94', 94", and 94'" will the design provide pull-out resistance (requiring a cable of at least a certain thickness to reach the fingers).

While the above is described with respect to skeleton 100 being internal said shell 64, connector 50 could also be constructed with skeleton 100 being external to said shell 64.

FIGS. 16-20 illustrate the feature of the invention that various configurations of skeleton 100' with other shapes are equally possible. In each of them, skeleton 100' is configured with a central wire passageway 101 therethrough which aligns with that in shell body 64'. In some instances, tabs 62' and flange 90' form a part of skeleton 100' while in others, they form a part of shell 64'. Also, skeleton 100' is configured with a deflectable surface 85 which engages and mechanically secures the wire 58 in passageway 98'. This surface 85 also prevents such wire 58 from being pull back out through passageway 98'.

Figure 16:
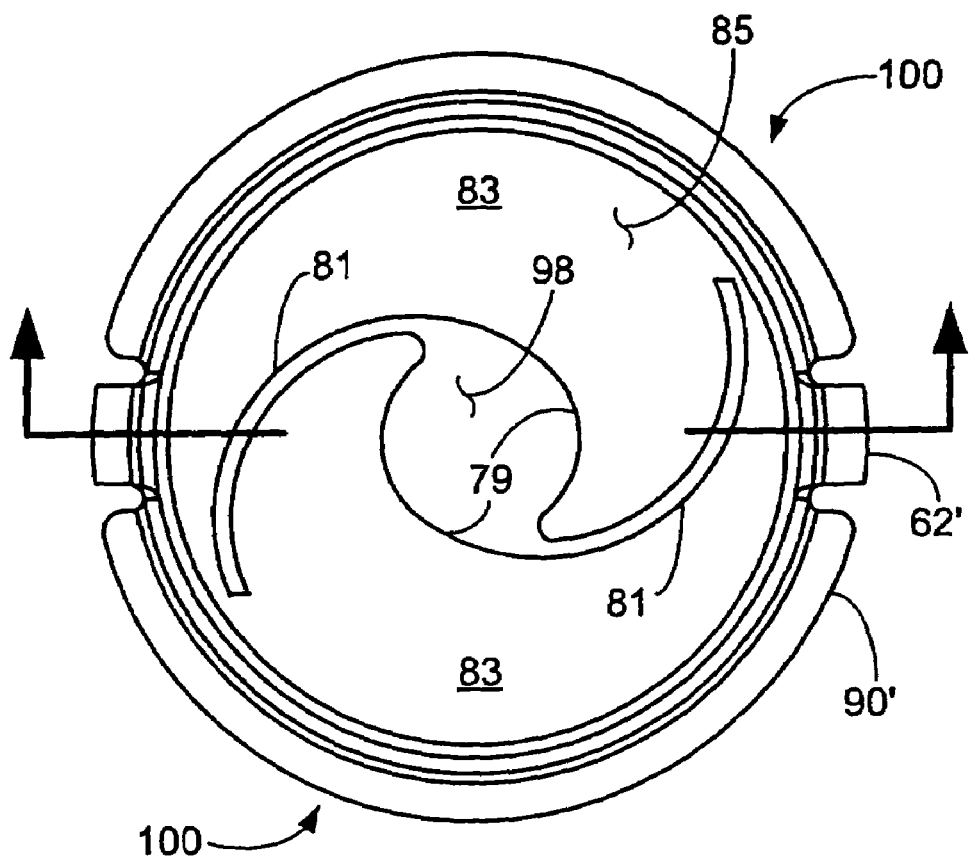
FIG. 16 is a top view of another embodiment of the present invention.
Figure 17:
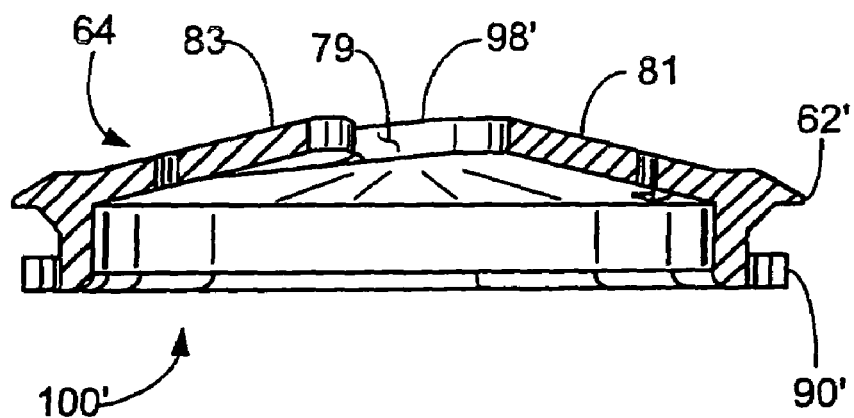
FIG. 17 is a cross sectional view of the embodiment shown in FIG. 16 taken along the lines D-D of FIG. 16.

FIGS. 16 and 17 illustrate a vortex type design for surface 85 with this vortex design incorporating two flexible flaps 83 bordering wire passageway 98'. Curved edges 79 are located along the border of wire passageway 98' and are designed to surround at least a portion of the perimeter of wire 58. These flaps 83 and curved edges 79 are deflected by the act of pushing wire 58 through passageway 98', such wire 58 expanding or enlarging the size of wire passageway 98'. Hence, flaps 83 and curved edges 79 become wedged or compress against such wire 58 when it is pulled back in the opposite direction. Slits 81 aid in the deflection of flaps 83 thereby allowing them to grip wire 58 in such a manner. Flaps 83 impart what might be said to be both a radially inward force to wire 58 as well as an axial force. Also, any attempted removal of wire 58 from connector 50 is resisted by now-deflected flaps 83 which would then be moved in compression. These flaps 83 transfer such withdrawal force to wall 52 thereby increasing even further the engagement of wall 52 with connector 50 as well as providing strain relief for wire 58.

Figure 18:
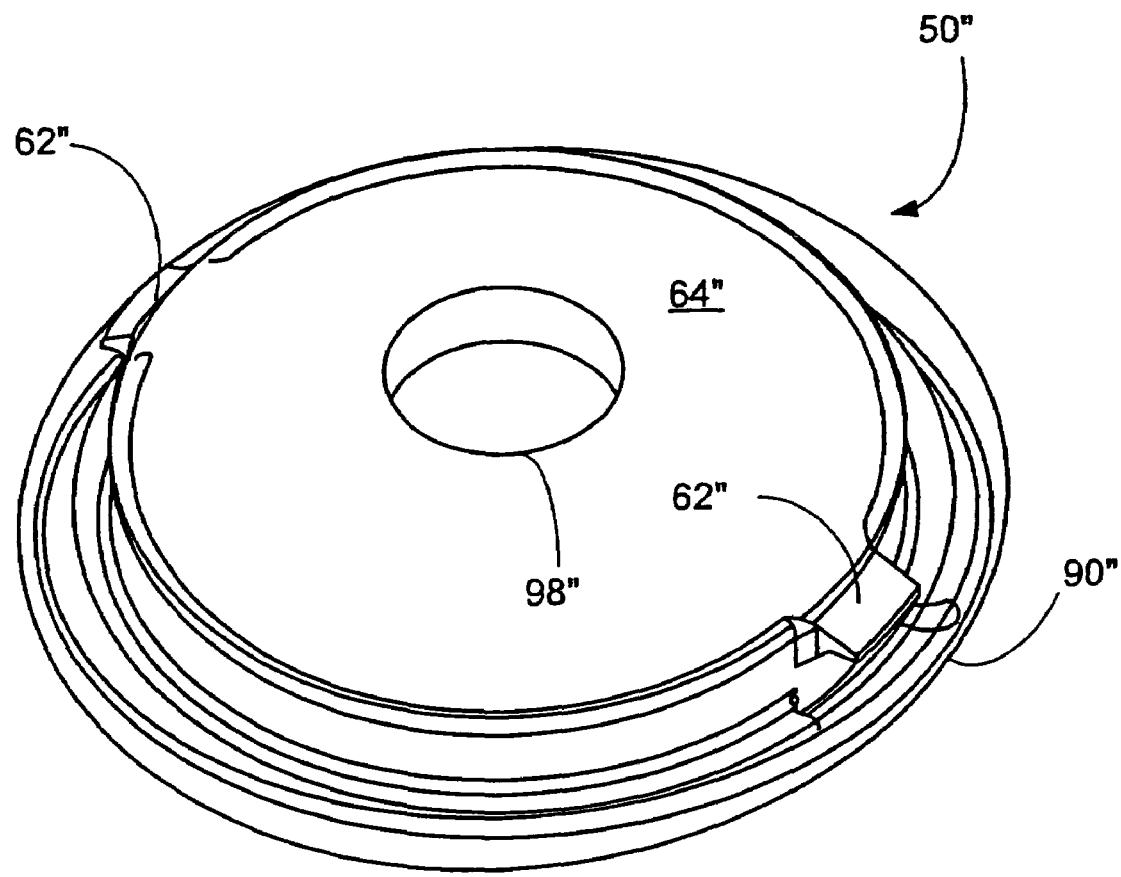
FIG. 18 is a perspective view of further another embodiment of the present invention.
Figure 19:
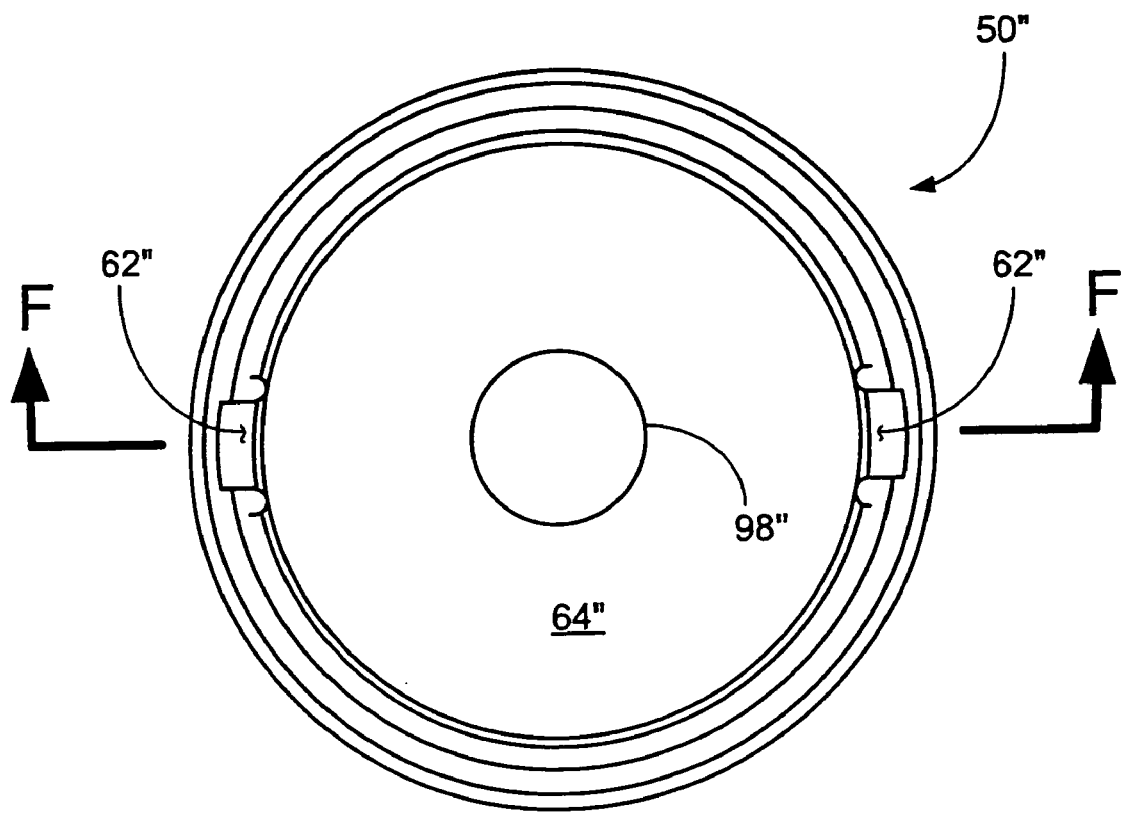
FIG. 19 is a top plan view of the embodiment as shown in FIG. 18.
Figure 20:
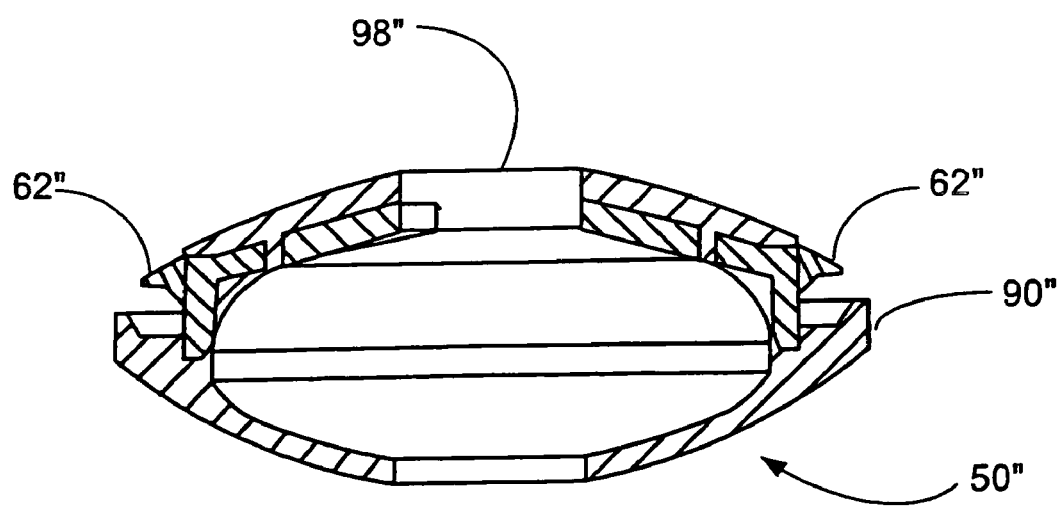
FIG. 20 is a cross sectional view of the embodiment shown in FIG. 19 taken along the lines F-F of FIG. 19.

FIGS. 18 to 20 discloses a further embodiment of the connector 50" invention with a circular shell body 64" and a set of tabs 62". This particular embodiment has been provided with an opening 98" and is double walled in contrast to the other embodiments discussed previously.

Having described the structure of different embodiments, the inventive method of utilizing a particular embodiment shall now be described with respect to FIGS. 13-15. As can be seen in FIG. 13, the connector 50 is applied to a box, as for instance box 54, from the outside surface of same, by appropriately opening up the knock-out opening 56, and then taking the connector 50, centering its tabs 60 on the knock-out opening 56 with the cam surfaces 65 placed against the outer margin 57 of the knock-out opening 56 at the box outer surface, and then pressing the connector 50 inwardly of the box or to the right of FIG. 13 to cam the tabs 60 toward each other sufficiently so that the box wall margin 57 defining the knock-out opening 56 slips snap fit fashion into the connector seat 76, and specifically into the recesses 76 between the respective tab shoulders and body rim segments to seat the connector 50 in the box knock-out opening 56. Body segments adjust radially of axis 91 as needed by the relative size of the knock-out opening 56 to which the connector 50 is applied.

The connector 50 being formed partly from resiliently flexible material, after the connector is snap fitted in place in the box, the jaws 62 return under their built in resilient bias to the substantially normal positioning indicated in FIGS. 7-12. As already indicated, in the cable free positioning of the fingers 94, 94', 94", and 94''', the jaw heads 68 are spaced from the plane of seat, whereby they are free to flex outwardly of axis 91 when cable 58 is to be applied to the connector, as described hereinafter.

The connector 50 in accordance with the invention is adapted to be applied to the box knock-out opening 56 without using any special tools, and normally finger pressing acting on the body, and specifically against its side, is adequate to effect mounting of the connector in the box. This may be facilitated when necessary by a light tapping action on the side of body member with a hammer where the sizing of the knock-out opening is somewhat smaller than will accommodate finger pressure application of the connector to the box knock-out opening 56.

Assuming that the end of a length of non-metallic sheathed cable 58 of the oval transverse cross-sectional configuration indicated in FIG. 14 is to be applied to the box 54 through the connector 50, the installer grasps the cable 58 adjacent the cable end 59, and presses the cable end 59 against the inside cam surfacing of jaws 62 to force them apart to receive and pass the cable end 59.

In this connection, the jaws 62 are arranged to receive the cable end 59 in any random or selected position of orientation about the axis 91 for complete convenience in applying the cable 58 to the connector 50 for cable of oval transverse cross-sectional configuration. In effecting the positioning, the installer will have applied the cable end 59 to the connector 50 so oriented that the long dimension of the cable transverse cross-sectional configuration is aligned with one of the pairs of jaws 62, and is roughly centered on the connector central axis 91. The cable end 59 is then pressed against the inside cam surfacing of the jaws 62 to force them apart somewhat so that the narrow side edges of the cable 58 will be lodged in and be engaged by the respective gripping edges of jaws 62 and the cable wide sides will be engaged by the jaw rim portions of jaws 62. By pressing the cable end 59 inwardly of the box 54, the jaws 62 are in effect cammed to the respective spread apart relation, which accommodates ready sliding movement of the cable 58 inwardly of the box 54 with respect to the connector 50. This also disposes the gripping edges of the jaws 62 in abutting relation with the narrow sides of the cable, and the gripping edges of the jaws 62 in abutting relation with the wide sides of the cable. The built in spring action of the connector fingers 94, 94', 94", and 94''' effects a light pressing action of the jaw rim portions, and thus gripping edges, on the external surfacing of the cable sheathing, but without any penetration within the cable sheathing. Insertion of the cable end 59 within the box through the connector 50 also somewhat outwardly angles or tilts the jaw heads 68 so that their jaw end portions project somewhat to the right of FIG. 15, on a somewhat expanded relation from the centered relation about axis 91 that is shown in FIG. 7.

However, jaws 62 are arranged so the cable end 59 may be inserted through connector 50 in any other position of orientation, relative to jaws 62, about axis 91, with the objective that some combination of the rim portions, and their gripping edges, of jaws 62 will provide the resilient gripping and withdrawal movement preventing action referred to, without penetrating the cable sheathing.

In any event, as long as the cable 58 is pressed to the right of FIG. 13, the cable will move smoothly into the box through the connector 50 due to the cam follower type sliding action that the jaw heads 68 have on the cable sheathing. When the insertion movement stops, the jaws 62 will remain somewhat spread apart from the positioning indicated in FIGS. 7-12, with the jaws 62, and specifically their rim portions, bearing with light pressure on the cable sheathing, and lightly indenting into, but not penetrating the cable sheathing. The non-metallic nature of the jaw rim portions and the bluntness of their gripping edges avoids risk of actual severing of the sheathing surface.

Should tension develop on the cable 58 tending to move the cable to the left of FIG. 15, the frictional engagement that the jaws 62 have with the cable sheathing tends to draw the jaws 62 together in a collet like manner to swing toward closed position against the external surfacing of the cable to the extent permitted by the jaw cross spacing. This effects a further indentation of the jaw rim portions of the respective jaws, and specifically, their gripping edges, into the cable sheathing to provide a firm movement restraining hold thereon.

Thus, when wire 58 is first pushed through passageway 101 in FIG. 10, it expands passageway 101 and deflects its outer surface. An opposite reactive force is thus generated in skeleton 100 which transfers this insertion force to wall 52 thereby resulting in firmer engagement of connector 50 with wall 52. Consequently, upon the insertion of wire 58, a greater force upon tabs 60 and flange 90 against wall 58 occurs than normally exists when no wire 58 extends through passageway 101.

It will thus be seen that with regard to the oval type cable diagrammatically illustrated in FIG. 14, the jaws 62 accommodate ready sliding movement of the cable inwardly of the connector and into the box to the extent desired. Tendencies of cable movement in the opposite direction tend to swing the jaw heads 68 somewhat to the left of FIG. 15, and thus toward each other due to the purchase the jaws have on the cable by reason of the indentations that the jaw rim portions make in the cable sheathing surfaces they engage in, that thereby lock the cable to the connector and thus to the box 54.

The connector 50 is thus in the nature of a self acting collet device in which the cable end 59 being inserted into the box 54 spreads apart the fingers 94, 94', 94", and 94''' for slidingly accommodating the cable's insertion, and tendencies of the cable 58 to move outwardly of the box swing the fingers 94, 94', 94", and 94''' sufficiently in the opposite direction to lock the cable 58 to the connector 50 without causing any cutting or severing type penetration of the cable sheathing.

The connector jaws 62 are arranged to also accept round cable, for instance, the cable 58 that is diagrammatically illustrated in FIG. 14. Round cable 58 is applied to the box 54 through the connector 50 in a similar manner, with the cable 58 end being pressed against the connector jaw inside cam surfaces 65 to separate the connector jaws 62, somewhat as indicated in FIG. 14 so that the cable 58 can be slid inwardly of the connector jaws 62 into the box 54. In this positioning of parts, the round cable 58 becomes centered between the rim portions of the jaws 62 substantially as indicated in FIG. 15. Again, as the cable is moved inwardly of the box, the cable sheathing slides smoothly over the jaw gripping edges, which edges are lightly pressed against the cable sheathing by the built in bias of the jaws that is occasioned by their being spread apart to insert the cable end into the box 54 through the connector 50.

The connector jaws 62 act to hold the cable 58 against withdrawal in a similar action as described in connection with the cable 58, with the edges indenting into the cable sheathing without cutting or severing the sheathing surface. It will therefore be seen that the invention provides a connector for non-metallic sheathed cable that is of one piece construction and adapted for ready application to box outlet openings utilizing the snap fit connection that has been described and illustrated, and without requiring any special tools to apply the connector to the box or cable to the connector. The connector 50 is free of clamps and other similar types of mechanical connecting devices, and no clamp acting on the cable end is required within the box in which the cable end extends.

The connector comprising the invention readily accepts both oval and round non-metallic sheathed cable with equal facility, and permits a ready sliding action on the cable end into the box. Movement tendencies of the cable in the opposite direction are immediately halted by the collet like closing action of the connector jaws on the cable.

While the connector is preferably made from elastomer and plastic or its equivalent, the connector may also be formed from any other suitable plastic or polymeric material that is dielectric or electrically non-conductive. Metallic and other materials that which, if formed to a sharp edge or point, will readily sever the cable sheathing, should be avoided to avoid the possibility of the connector jaw teeth severing the cable sheathing.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention. Various changes to the foregoing described and shown structures would now be evident to those skilled in the art. Accordingly, the particularly disclosed scope of the invention is set forth in the following claims.

As can be seen in FIGS. 13, 14 and 15, reference numeral 50 generally indicates a preferred embodiment of the invention, that is shown applied to a wall 52 of a box 54 (of which only the indicated portion of wall 52 is shown), and specifically whithin the knock-out opening 56 that is formed in the box. The connector 50 is pushed into the kock-out or opening 56 from one side through an opening in wall 52 in the normal fashion. In essence, the connector 50 sandwiches the perimeter 57 of the knock-out opening 56 in the wall 52 between a pair of tabs 60, 60 ' on one side and a rubber-coated flange 90 (over-molded by the elastomeric circumferential ledge 84 as shown) on the other, thus imparting more force on either sides of the wall 52 than force imparted by the pliable shell. Flange 90 acts as a stop measure, preventing connector 50 from being pushed completely through the wall opening 56. The outer surface of tab 60 is inclined to ease its insertion through the opening 56. In essence, connector 50 helps isolate wire 58 from the sharp edges of the perimeter 57 of the knock-out opening 56, thereby preventing the wire's insulation from being scraped off or otherwise removed during wire insertion and/or pulling while maintaining an inner box environment that is contaminant free.

FIGS. 9 and 10 illustrate an inner finger type design for the above-mentioned collet function with this finger design incorporating a plurality of fingers or inwardly jutting pronged cable supports 94, 94', 94", and 94''' having tips or apex 99 of deflectable appendages bordering wire passageway 101. In essence, at the interior side 97 of the side wall 92, at or near the bottom end 93 are four inwardly directed fingers 94, 94', 94", and 94''' curved upwardly away from the flange 90. Because the fingers 94, 94', 94", and 94''' are angled towards the inside of the box 54 (i.e. in the direction of cable travel) this makes it easier to push the cable through. Also, because the fingers 94, 94', 94", and 94''' are curved inwardly, not outwardly, cable pull-out is resisted better by the design.

What is claimed is:

1. A cord connector assembly comprising:
   a skeleton part characterized by a circumferential hoop with an end and another distal end, said skeleton part having an outer flange and at least a pair of inwardly jutting pronged cable supports adjacent said end, and at least a radially outwardly protruding tab on said another distal end; and
   a pliable shell over-molded around at least a portion of said skeleton part, said pliable shell having a center portion shaped to allow passage of a cable wire and provide strain relief to the cable wire but prevent passage of contaminants, wherein said protruding tab is configured to be pressed through a wall opening, and said protruding tab and said outer flange are fashioned to jointly and directly impart more force on either sides of the wall than force imparted by said pliable shell.

2. A cord connector assembly according to claim 1, wherein said center portion is a thin elastomer membrane which serves to plug the wall opening until pierced by the cable wire and the connector assembly itself remains contaminant-free.

3. A cord connector assembly according to claim 1, wherein said strain relief and sealing characteristics defined by passage prevention of contaminants automatically occur upon the cable wire insertion and do not require any secondary operation or installation step.

4. A cord connector assembly according to claim 1, wherein the cord connector assembly has a low profile that eliminates any chance of interference with other parts in an electrical outlet box.

5. A cord connector assembly according to claim 1, wherein said center portion is configured, so that said center portion can accommodate a variety of different cord gauges.

6. A cord connector assembly according to claim 1, wherein the assembly is sized slightly bigger than the wall opening into which the assembly will fit so as to allow engagement with a non-standard opening size.

7. A cord connector assembly according to claim 1, wherein said pair of inwardly jutting pronged cable supports are curved upwardly away from said flange to make it easier to push the cable wire through and provide a high cable retention force further preventing removal of the cable wire once inserted.

8. A cord connector assembly according to claim 1, wherein said pair of inwardly jutting pronged cable supports curve upwardly in a direction away from said flange to make it easier to push the cable wire through and provide a high cable retention force further preventing removal of the cable wire once inserted.

9. A cord connector assembly according to claim 1, wherein said pair of inwardly jutting pronged cable supports extend from a mid-region of said end, or from a region of said hoop closest to said flange to provide a stronger cable wire support and result in a low profile for the cord connector assembly.

10. A cord connector assembly according to claim 1, wherein said pair of inwardly jutting pronged cable supports extend substantially close to said center portion and substantially close to each other to allow insertion of a wide range of different wire shapes and different gauges as well as a thick power cabling as well as a thin data cabling.

11. A cord connector assembly according to claim 1, wherein said pair of inwardly jutting pronged cable supports includes a mid-region that is slightly reduced in thickness, so that said supports will flex at a mid-region and not at the base.

12. A cord connector assembly according to claim 1, wherein each of said pair of inwardly jutting pronged cable supports is perforated so that said supports will flex at a mid-region and not at the base.

13. A cord connector assembly according to claim 1, wherein the cord connector assembly is pivoted against the inserted cable wire so that the assembly projects outward from the cable wire at a 45 or less degree angle rather than at its normal 90 degrees, causing said cable supports to be mis-aligned with each other and enable the connector assembly to be slid off the cable wire.

14. A cord connector assembly according to claim 1, wherein said cable supports are slightly bent toward an end so that an insertion of the cable wire is supported, but an expulsion of the cable wire is made difficult, without excessive force, said cable supports including deflectable appendages which are deflected by the passage of the cable wire through said center position, said deflectable appendages further restricting the removal of the cable wire back through said center position.

15. A cord connector assembly according to claim 1, wherein said flange has a plurality of apertures to engage with said pliable shell.

16. A cord connector assembly according to claim 1, wherein the cord connector assembly is made to plug into the wall opening in the same direction as the insertion direction of the cable.

17. A cord connector assembly as set forth in claim 14, wherein said deflectable appendages comprise a plurality of inwardly directed fingers having distal ends that are deflected by the insertion of the cable wire through the connector.

18. A cord connector assembly as set forth in claim 14, wherein said deflectable appendages comprise at least one curved edge arranged around the boundary of a cable wire passageway, said curved edge and said appendages being deflected by the insertion of the cable wire through the connector assembly.

19. A cord connector assembly according to claim 14 further comprising:
at least one additional tab spaced away from said flange wherein said tabs are deflectable so as to be pushed through the wall opening and wherein said flange prevents the further movement of the connector assembly through the wall opening.

20. A cord connector assembly according to claim 19, wherein at least one of said tabs and said flange forms a part of said skeleton.

21. A cord connector comprising:
(a) a pliable shell having a wire passageway therethrough;
(b) a more rigid skeleton adjoining said shell also having a wire passageway therethrough, said skeleton having deflectable appendages which are deflected by the passage of a wire through said wire passageway, said deflectable appendages further restricting the removal of said wire back through said wire passageway; and (c) whereby said pliable shell seals around said wire in said wire passageway and said skeleton provides strain relief to said wire in said wire passageway, wherein said deflectable appendages are curved upwardly away from a flange at one end of said more rigid skeleton to make it easier to push the cable wire through and provide a high cable retention force further preventing removal of the cable wire once inserted.

22. A cord connector as set forth in claim 21, further comprising:
at least one tab spaced from a flanges wherein said tab is deflectable so as to be pushed through an opening and wherein said flange prevents the further movement of the connector through the opening.

23. A cord connector as set forth in claim 22, wherein at least one said tab or said flange form a part of said skeleton.

24. A cord connector as set forth in claim 22, wherein at least one said tab or said flange form a part of said shell.

25. A cord connector as set forth in claim 21, wherein said deflectable appendages comprise a plurality of inwardly directed fingers having distal ends that are deflected by the insertion of a wire through the connector.

26. A cord connector as set forth in claim 21, wherein said deflectable appendages comprise at least one curved edge arranged around the boundary of said wire passageway, said curved edge and said appendages being deflected by the insertion of a wire through the connector.

27. A cord connector according to claim 21, wherein said shell includes a center portion formed of a thin elastomer membrane which serves to plug the wall opening until pierced by a cable wire and the connector assembly itself remains contaminants-free.

28. A cord connector according to claim 27, wherein said center portion is configured so that said center portion can accommodate a variety of different cord gauges.

29. A cord connector according to claim 21, wherein said strain relief and sealing characteristics defined by passage prevention of contaminants automatically occur upon the wire insertion and do not require any secondary operation or installation step.

30. A cord connector according to claim 21, wherein the cord connector has a low profile that eliminates any chance of interference with other parts in an electrical outlet box.

31. A cord connector according to claim 21, wherein the connector is sized slightly bigger than the opening into which the connector will fit so as to allow engagement with a non-standard opening size.

32. A cord connector according to claim 21, wherein said deflectable appendages are part of at least a pair of inwardly jutting pronged cable supports which curve upwardly in a direction away from said flange to make it easier to push the wire through and provide a high cable retention force further preventing removal of the wire once inserted.

33. A cord connector according to claim 32, wherein each of said pair of inwardly jutting pronged cable supports is perforated so that said support will flex at a mid-region and not at its base.

34. A cord connector according to claim 21, wherein said deflectable appendages are part of at least a pair of inwardly jutting pronged cable supports extending from a mid-region of said end, or from a perimeter region of said skeleton closest to said flange to provide a stronger support and result in a low profile for the cord connector.

35. A cord connector according to claim 21, wherein said deflectable appendages are part of at least a pair of inwardly jutting pronged cable supports extending substantially close to the center portion of the connector and substantially close to each other to allow insertion of a wide range of different wire shapes and gauges as a thick power cabling as well as a thin data cabling.

36. A cord connector according to claim 21, wherein said deflectable appendages are part of at least a pair of inwardly jutting pronged cable supports with a mid-region that is slightly reduced in thickness, so that said support will flex at a mid-region and not at its base.

37. A cord connector according to claim 21, wherein the cord connector is pivoted against the inserted wire so that the connector projects outward from the wire at a 45 or less degree angle rather than at its normal 90 degrees, causing said deflectable appendages to be mis-aligned with each other and enable the connector to be slid off the wire.

38. A cord connector according to claim 21, wherein said deflectable appendages are slightly bent toward an end so that an insertion of the wire is supported, but an expulsion of the wire is made difficult, without excessive force, said deflectable appendages being deflected by the passage of the wire through a center position of the connector, said deflectable appendages further restricting the removal of said wire back through said center position.

39. A cord connector according to claim 21, wherein said flange includes apertures to engage with said pliable shell.

40. A cord connector according to claim 21, wherein the cord connector is made to plug into a wall opening in the same direction as the insertion direction of the wire.

41. A cord connector as set forth in claim 21, wherein said deflectable appendages comprise a plurality of inwardly directed fingers having distal ends that are deflected by the insertion of the wire through the connector.

42. A cord connector as set forth in claim 21, wherein said deflectable appendages comprise at least one curved edge arranged around the boundary of said wire passageway, said curved edge and said appendages being deflected by the insertion of the wire through the connector.

43. A method of manipulating a connector for insertion into and removal out of a wall aperture for reuse of the connector, the method comprising:

provide a connector with a skeleton part characterized by a circumferential hoop with an end and another distal end, said skeleton part having an outer flange and at least a pair of inwardly jutting pronged cable supports adjacent said end, and at least a radially outwardly protruding tab on said another distal end; and include a pliable shell over-molded around at least a portion of said rigid skeleton part, said pliable shell having a center portion shaped to allow passage of a cable wire and facilitate strain relief to the cable wire but prevent passage of contaminants, wherein said protruding tab is configured to be pressed through a wall opening and said protruding tab and said outer flange are fashioned to jointly and directly impart more force on either sides of the wall than force imparted by an extension of said pliable shell; and skew/pivot said connector on the cable wire so that said connector projects outward from the cable wire at a 45 or less degree angle rather than at its normal 90 degrees; and slide off said connector off the cable wire once said supports are mis-aligned with each other.

* * * * *

UNITED STATES PATENT AND TRADEMARK OFFICE
CERTIFICATE OF CORRECTION

PATENT NO. : 7,332,678 B2
APPLICATION NO. : 11/491221
DATED : February 19, 2008
INVENTOR(S) : Pyron et al.

It is certified that error appears in the above-identified patent and that said Letters Patent is hereby corrected as shown below:

At column 7, line 28, the printed patent incorrectly reads "... on the other. Flange 90 acts as a stop measure, ..."; the patent should read --... on the other, thus imparting more force on either sides of the wall 52 than force imparted by the pliable shell. Flange 90 acts as a stop measure, ...--.

At column 10, line 12, the printed patent incorrectly reads "... plurality of fingers 94, 94', 94", and 94''' having ..."; the patent should read --...plurality of fingers or inwardly jutting pronged cable supports 94, 94', 94" and 94''' having ...--.

At column 10, line 13, the printed patent incorrectly reads "... apex 99 bordering wire passageway ..."; the patent should read --...apex 99 of deflectable appendages bordering wire passageway ...--.

At column 12, line 23, the printed patent incorrectly reads "...being pull back out through passageway..."; the patent should read --...being pulled back out through passageway...--.

At column 18, line 11 (Claim 22), the printed patent incorrectly reads "...spaced from a flanges wherein said tab ..."; the patent should read --...spaced from a flange, wherein said tab...--.

At column 15, lines 42-67 beginning with "As can be seen in FIGS. 13, 14, and 15, ..." and ending with "a plurality of fingers or inwardly jutting" should be deleted.

At column 16, lines 1-11 beginning with "pronged cable supports 94, 94', 94", and 94''' ..." and ending with "... is resisted better by design." should be deleted.

Signed and Sealed this

First Day of July, 2008

JON W. DUDAS
*Director of the United States Patent and Trademark Office*